(12) United States Patent
Kapoor et al.

(10) Patent No.: US 12,505,513 B2
(45) Date of Patent: Dec. 23, 2025

(54) METHODS, SYSTEMS AND COMPUTER PROGRAMS FOR PROCESSING IMAGE DATA FOR GENERATING A FILTER

(71) Applicant: Volkswagen Aktiengesellschaft, Wolfsburg (DE)

(72) Inventors: Nikhil Kapoor, Wolfsburg (DE); Peter Schlicht, Wolfsburg (DE); Serin Varghese, Braunschweig (DE); Tim Fingscheidt, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 346 days.

(21) Appl. No.: 18/022,709

(22) PCT Filed: Aug. 4, 2021

(86) PCT No.: PCT/EP2021/071713
§ 371 (c)(1),
(2) Date: Feb. 22, 2023

(87) PCT Pub. No.: WO2022/043010
PCT Pub. Date: Mar. 3, 2022

(65) Prior Publication Data
US 2023/0325982 A1    Oct. 12, 2023

(30) Foreign Application Priority Data

Aug. 26, 2020 (EP) .................................... 20192808

(51) Int. Cl.
G06T 5/70 (2024.01)
G06T 5/20 (2006.01)

(52) U.S. Cl.
CPC .................. *G06T 5/70* (2024.01); *G06T 5/20* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 10,521,718 | B1 | 12/2019 | Szegedy et al. |
| 2019/0005386 | A1 | 1/2019 | Chen et al. |
| 2020/0051260 | A1* | 2/2020 | Shen ...................... G06V 10/82 |
| 2021/0035532 | A1* | 2/2021 | Li ............................ G09G 5/37 |

(Continued)

OTHER PUBLICATIONS

Gao ("Improved Detection of Adversarial Images Using Deep Neural Networks." Master Project. Dept. Computer Science, Georgia State University; Apr. 20, 2020) (Year: 2020).*
PCT/EP2021/070373. International Search Report (Oct. 20, 2021).

(Continued)

*Primary Examiner* — Leon Viet Q Nguyen
(74) *Attorney, Agent, or Firm* — Peter Zura; LOZA & LOZA, LLP

(57) ABSTRACT

A method, system and computer program for processing image data, to a vehicle comprising such a system, and to a method, system and computer program for generating a filter. Image data processing may include obtaining the image data, and applying a filter on the image data to generate filtered image data, the filter being configured to suppress adversarial perturbations within the image data. The filtered image data is processed using a machine-learning model.

20 Claims, 14 Drawing Sheets

(56) References Cited

U.S. PATENT DOCUMENTS

2021/0157911 A1* 5/2021 Yu .......................... G06N 3/08
2021/0272248 A1* 9/2021 Slutsky ................ G06F 18/214

OTHER PUBLICATIONS

Priority Appln. No. EP20192808.2 Office Action (Feb. 4, 2021).

Akhtar et al. "Defense Against Universal Adversarial Perturbations." Proceedings of the IEEE Conference on Computer Vision and Pattern Recognition (CVPR) pp. 3389-3398 (2018).

Arvinte et al. "Detecting Patch Adversarial Attacks with Image Residuals." arXiv:2002.12504 [cs.CV] (Mar. 2, 2020).

Dzuigaite et al. "A study of the effect of JPG compression on adversarial images." arXiv:1608.00853 [cs.CV] (Aug. 2, 2016).

Gao. "Improved Detection of Adversarial Images Using Deep Neural Networks." Master Project. Dept. Computer Science, Georgia State University (Apr. 20, 2020).

Kapoor et al. "From a Fourier-Domain Perspective on Adversarial Examples to a Wiener Filter Defense for Semantic Segmentation." 2021 International Joint Conference on Neural Networks (IJCNN), Shenzhen, China, pp. 1-8 (2021).

Mustafa et al. "Image Super-Resolution as a Defense Against Adversarial Attacks." IEEE Transactions on Image Processing, vol. 29, pp. 1711-1724 (2020).

Raff et al. "Barrage of Random Transforms for Adversarially Robust Defense." Proceedings of the IEEE/CVF Conference on Computer Vision and Pattern Recognition (CVPR) pp. 6528-6537 (2019).

Shaham et al. "Defending against Adversarial Images using Basis Functions Transformations." arXiv:1803.10840 [stat.ML] (Apr. 18, 2018).

Wang et al. "Defending Against Adversarial Attack Towards Deep Neural Networks Via Collaborative Multi-Task Training." IEEE Transactions on Dependable and Secure Computing, vol. 19, No. 2, pp. 953-965, 1 (Mar.-Apr. 2022).

* cited by examiner

| Dataset | Method | | Average SSIM | | | Average MSE | | |
|---|---|---|---|---|---|---|---|---|
| | | | Attacked | Attacked Denoised | Clean Filtered | Attacked | Attacked Denoised | Clean Filtered |
| $\mathcal{D}_{CS}^{val}$ | Wiener (Ours) | $G$ (upper limit) (8) | 0.89 | 0.95 | 1.00 | 78.76 | 47.80 | 0.00 |
| | | $G^{(a)}$ (13) matched | | 0.95 | 0.99 | | 57.20 | 14.07 |
| | | $G^{(a)}$ (13) unmatched | | 0.93 | 1.00 | | 56.04 | 5.12 |
| | | $G^{(Metzen\_Ped)}$ (13) matched | | 0.92 | 1.00 | | 59.11 | 4.38 |
| | | $G^{(Metzen\_Ped)}$ (13) unmatched | | 0.91 | 1.00 | | 62.54 | 2.23 |
| | | $G^{(mFGSM\_Car)}$ (13) matched | | 0.94 | 0.98 | | 65.96 | 23.99 |
| | | $G^{(mFGSM\_Car)}$ (13) unmatched | | 0.93 | 0.99 | | 58.19 | 8.47 |
| | | $G^{(A)}$ (14) matched | | 0.94 | 0.99 | | 59.18 | 11.38 |
| | | $G^{(A)}$ (14) unmatched | | 0.92 | 1.00 | | 59.25 | 4.28 |
| | JPEG compression | | | 0.90 | 0.98 | | 82.50 | 13.92 |
| | JPEG 2000 compression | | | 0.89 | 1.00 | | 80.42 | 0.00 |
| | NL Means | | | 0.92 | 0.98 | | 60.71 | 8.61 |
| | Median Blur | | | 0.90 | 0.98 | | 84.20 | 16.17 |
| | Bit Depth Reduction | | | 0.86 | 0.95 | | 86.87 | 17.48 |
| | Wiener $G^{(A)}$ (matched) + NL Means | | | 0.94 | 0.97 | | 57.03 | 23.74 |
| | Wiener $G^{(A)}$ (unmatched) + NL Means | | | 0.94 | 0.97 | | 51.76 | 15.61 |

Fig. 3c

| Method | | none (clean) | mFGSM (car) | mFGSM (Ped) | Metzen (Car) | Metzen (Ped) | I.M. | Mopuri | All attacks (mean) |
|---|---|---|---|---|---|---|---|---|---|
| Baseline mIoU (%) | | 67.25 | 20.23 | 20.39 | 64.61 | 65.73 | 42.87 | 27.65 | 40.24 |
| $G$ (upper limit) (8) | | 67.25 | 35.97 | 36.53 | 65.77 | 66.49 | 50.31 | 41.27 | 49.39 |
| Wiener (Ours) | $G^{(a)}$ (13) matched | 66.43 | 32.53 | 33.05 | 65.48 | 66.22 | 46.60 | 38.96 | 47.14 |
| | unmatched | 67.03 | 28.37 | 28.73 | 65.14 | 66.03 | 44.67 | 33.75 | 44.45 |
| | $G^{(metzen\_ped)}$ (13) matched | 67.12 | 24.98 | 25.14 | 65.47 | 66.22 | 46.29 | 31.20 | 43.22 |
| | unmatched | 67.18 | 22.75 | 22.91 | 65.13 | 66.03 | 44.44 | 29.54 | 41.80 |
| | $G^{(mfgsm\_car)}$ (13) matched | 65.54 | 32.53 | 33.18 | 66.07 | 66.07 | 53.75 | 37.37 | 48.16 |
| | unmatched | 66.85 | 28.37 | 28.75 | 65.84 | 66.39 | 49.41 | 34.16 | 45.49 |
| | $G^{(A)}$ (14) matched | 66.76 | 28.82 | 29.14 | 65.94 | 66.38 | 49.98 | 35.02 | 45.88 |
| | unmatched | 67.07 | 25.43 | 25.60 | 65.51 | 66.26 | 46.70 | 31.80 | 43.55 |
| Denoised mIoU (%) | JPEG Compression | 66.99 | 20.27 | 20.05 | 65.03 | 65.80 | 46.72 | 27.94 | 40.96 |
| | JPEG 2000 compression | 67.25 | 20.12 | 20.25 | 64.61 | 65.73 | 42.87 | 27.52 | 40.18 |
| | NL Means | 65.50 | 27.20 | 27.49 | 66.45 | 66.48 | 55.20 | 33.44 | 46.04 |
| | Median Blur | 67.05 | 21.59 | 20.98 | 65.64 | 66.47 | 47.64 | 28.41 | 41.78 |
| | Bit Depth Reduction | 62.07 | 19.77 | 19.77 | 62.24 | 62.88 | 45.87 | 26.80 | 39.55 |
| | Wiener $G^{(A)}$ (matched) + NL Means | 65.18 | 35.87 | 37.07 | 66.46 | 66.49 | 59.65 | 41.65 | 51.19 |
| | Wiener $G^{(A)}$ (unmatched) + NL Means | 65.47 | 32.22 | 32.93 | 66.83 | 66.93 | 57.95 | 38.44 | 49.21 |

Fig. 3d

| Method | none (clean) | mFGSM (car) | mFGSM (Ped) | Metzen (Car) | Metzen (Ped) | I.M. | Mopuri | All attacks (mean) |
|---|---|---|---|---|---|---|---|---|
| Baseline mIoU (%) | 48.48 | 20.97 | 20.65 | 28.30 | 31.39 | 19.77 | 30.42 | 28.56 |
| $G$ (upper limit) (8) | 48.48 | 29.84 | 29.86 | 36.75 | 38.92 | 31.42 | 37.81 | 36.15 |
| $G^{(a)}$ (13) | 48.15 | 27.93 | 27.60 | 34.99 | 37.33 | 27.89 | 37.28 | 32.17 |
| $G^{(Metzen\_Car)}$ (13) | 48.28 | 27.25 | 26.95 | 34.99 | 37.33 | 27.60 | 34.92 | 31.50 |
| $G^{(mFGSM\_car)}$ (13) | 48.12 | 27.93 | 27.60 | 34.95 | 37.38 | 27.84 | 35.85 | 31.92 |
| $G^{(A)}$ (14) | 48.21 | 27.52 | 27.38 | 34.99 | 37.26 | 27.56 | 35.87 | 31.76 |
| JPEG Compression | 48.09 | 23.30 | 23.06 | 30.98 | 34.18 | 23.04 | 31.64 | 27.70 |
| JPEG 2000 compression | 48.48 | 23.06 | 22.99 | 30.57 | 33.84 | 22.19 | 31.89 | 27.41 |
| NL Means | 48.03 | 24.62 | 24.64 | 32.44 | 35.67 | 24.47 | 33.26 | 29.17 |
| Median Blur | 48.42 | 23.46 | 23.49 | 31.66 | 34.92 | 23.52 | 32.11 | 28.19 |
| Bit Depth Reduction | 46.39 | 22.86 | 22.76 | 30.82 | 33.99 | 22.63 | 31.27 | 27.38 |
| Wiener $G^{(A)}$ + NL Means | 47.78 | 29.60 | 29.33 | 37.36 | 39.12 | 30.59 | 37.08 | 33.84 |

Fig. 3e

| Attack | Target | Parameter | Epsilon $\varepsilon$ $L\infty$ | $L_2$ | Iterations |
|---|---|---|---|---|---|
| mFGSM | Car | $\mu = 10$ | 5, 10 | 5000 | 20 |
|  | Pedestrian |  | 5, 10 | - | 20 |
| Metzen | Car | - | 5, 10, 40 | - | 20 |
|  | Pedestrian | - | 5, 10, 40 | - | 20 |
| I.M. | - | - | 5, 10, 40 | - | 20 |
| Mopuri | - | $\mu = 1$ $\ell$ = "conv3" | 5, 10 | - | 20 |

Fig. 3f

| Method | Parameters |
|---|---|
| JPEG compression | Quality = 90 |
| JPEG 2000 compression | Quality = 400 |
| NL Means | Search Window = 13x13, Patch Size = 3x3, Filter Strength = 2 |
| Median Blur | Filter Size = 3x3 |
| Bit-Depth Reduction | Bits = 5 |

Fig. 3g

Expected Amplitude Spectrum of Aversarial Noise
$$E(|\mathcal{F}(x^{adv}-x)|)$$

Metzen (Ped)

Metzen (Car)

Iterative Mirror

Mopuri

MFGSM (Ped)

MFGSM (Car)

METHODS, SYSTEMS AND COMPUTER PROGRAMS FOR PROCESSING IMAGE DATA FOR GENERATING A FILTER

RELATED APPLICATIONS

The present application claims priority to international Patent Application No. PCT/EP2021/071713 to Nikhil Kapoor et al., titled "Methods, Systems And Computer Programs For Processing Image Data And For Generating A Filter", filed Aug. 4, 2021, which claims priority to European Patent App. No. EP 20192808.2, filed Aug. 26, 2020, the contents of each being incorporated by reference in their entirety herein.

BACKGROUND

Aspects of the present disclosure relate to a method, system and computer program for processing image data, to a vehicle comprising such a system, and to a method, system and computer program for generating a filter.

Machine learning has great potential for modern driver assistance systems and automated driving. Functions based on deep neural networks process raw sensor data (e.g., from camera, radar, lidar) to derive relevant information. This includes, for example, the type and position of objects in the vehicle environment, their behavior, or roadway geometries and topologies. Among these types of networks, convolutional neural networks (CNNs) have proven to be particularly suitable for image processing.

A major simplification in the development of deep neural networks (more precisely: in the training process) is the purely data-driven parameter fitting without expert intervention: The deviation (the so-called loss) of the output (for a given parameterization) of a neural network from a ground truth is measured. The loss function used is chosen in such a way that the parameters depend on it in a differentiable way. In the gradient descent, the parameters of the network are adjusted in each training step depending on the derivation of the deviation (determined on several examples). These training steps are repeated very often until the loss is no longer reduced.

In such a procedure, the model parameters are determined without expert judgement or semantically motivated modeling. This has significant consequences for the properties of the neural network.

First, deep neural networks are largely non-transparent for humans and their calculations cannot be interpreted. This is a challenge for systematic testing or formal verification.

Second, various deep neural networks are susceptible to adversarial perturbations (i.e., disturbances caused by a malicious actor or by challenges in the generation of the image data): small manipulations of the input data that are hardly perceptible to humans or do not change the situation assessment can lead to completely different output data. Such manipulations can be both deliberate changes to the data ("neural hacking") and random image changes (sensor noise, weather influences, certain colors or contrasts etc.).

Third, it may be unclear to which input characteristics an algorithm sensitizes. This means that synthetic data can hardly be used successfully for training neural networks, as neural networks trained in simulation or on otherwise synthetic data show a surprisingly weak performance on real sensor data. Even the execution of neural networks in a different domain (training in summer, execution in winter, presence of augmentations, etc.) can sometimes reduce the functional quality. One of the consequences is that the possibility of developing and releasing neural networks in simulation, which sounds very attractive in itself, due to the elimination of expensive labelling and complex real tests, might not seem realistic.

There are different approaches for overcoming the challenges described above. For example, the training may be performed with as many different data sets as possible: When preparing the training, care may be taken to ensure that the widest possible range of data (different contexts, different sources such as simulation and real data different sensors, augmented data) is used. The hope is that the algorithm will work in different domains.

Additionally or alternatively, transfer learning and domain adaptation may be performed. These are special algorithms which generally allow the adaptation of an algorithm to a new domain. This is done either by trying to make the neural networks insensitive to the differences between the domains, or by a focused post-training with few training samples from the target domain.

In some cases, adversarial training may be performed. Here, the training data are modified before a training iteration in such a way that they have a maximum deceptive effect on the currently available network (i.e. adversarial perturbations are applied to the current training date). The data may then be used to train the neural network.

Additionally or alternatively, post-processing may be applied to the neural network to ensure stability and robustness properties, e.g. by additional software (augmentation of inference data, plausibility check of the network output, use of heat maps, automatic sensor data pre-processing) or by subsequent modification of the network after training (also denoted pruning, quantization) or modified inference of the networks after deployment (e.g. through multiple inference and assembling).

The approaches presented above may not scale for all adversarial perturbances (even for networks improved by adversarial training, adversarial examples can be found) and may not improve the comprehensibility of information processing by a neural network. Furthermore, they offer only a slight improvement in robustness and do not work well for difficult classification tasks (such as ImageNet object detection or semantic segmentation). An additional test effort to intercept non-robustness against adversarial perturbances may further increase the already large effort for testing perceptual functions for functional validation. This is a central challenge in economic terms. Furthermore, at least some of the above approaches are computationally complex, which seems difficult in light of the goal of continuous and incremental development and the execution of the automatic driving function on embedded computers.

Therefore, to mitigate adversarial images, an "arms race" is currently taking place. As soon as an adversarial attack becomes known, a defense mechanism is specifically designed against it, whereupon new attacks are developed against which the defense mechanism is ineffective. However, this approach might not be considered sustainable, as it does not address the core of the problem. Imperceptibility as a tool has so far been largely ignored. Conceptual procedures for obtaining robust networks "by design" are largely unknown and are the focus of current research.

The publication Shaham et al., titled "Defending against Adversarial Images using Basis Functions Transformations" studies the effectiveness of various approaches that defend against adversarial attacks on deep networks. In said paper, low-pass filtering, PCA, JPEG compression, low resolution wavelet approximation and soft-thresholding are compared with respect to their effectiveness to defend against adversarial attacks. The discussed approaches are based on manipulating the data being input into the deep networks, by transforming the input data in the basis function space. In both low-pass filtering and JPEG compression, high frequency components are removed from the input images.

The publication Raff et al., titled "Barrage of Random Transforms (BaRT) for Adversarially Robust Defense" also relates to defenses against adversarial examples. The BaRT combines various techniques of introducing noise into the input data. One of the techniques is based on perturbing the 2D Fast Fourier Transform of each channel separately. In the frequency domain, the coefficients are scaled based on a random multiplier $\in$ [0.98,1.02]. Some of the coefficients are zeroed out.

BRIEF SUMMARY

There is a need for providing an improved configuration for the machine-learning based processing of image data that provides an improved handling of adversarial images.

Aspects of addressing such needs are described in the present disclosure and by the subject-matter of the claims recited below.

Aspects of the present disclosure are based on the finding that, in adversarial images, the adversarial content that is overlaid over the original images adheres to a pre-defined pattern in the frequency domain, which often looks like a grid in a visualization of the adversarial image in the frequency domain. This property can be used to design a filter that can be used to suppress the adversarial perturbations within the image data. For example, the filter can be applied in the frequency domain. In an exemplary implementation, a Wiener filter can be used to suppress the adversarial perturbations within the image data.

In some examples, a method is disclosed for processing image data. The method comprises obtaining the image data, and transforming the image data into the frequency domain. A filter is applied on the image data in the frequency domain to generate filtered image data. The filter is configured to suppress adversarial perturbations within the image data. In some examples, the filter may be configured as a Wiener filter being adapted to suppress adversarial perturbations within the image data. The filtered image data may be transformed into the spatial domain, where the filtered image data is processed using a machine-learning model. The filtered image data is input to the machine-learning model after the filter image data is transformed into the spatial domain. For example, the filter may be configured to suppress the adversarial perturbations according to their pattern in the frequency domain.

As mentioned above, the perturbations can be observed by the patterns they create in a visualization of the image in the frequency domain. Accordingly, the method comprises transforming the image data into the frequency domain, applying the filter on the image data in the frequency domain, and transforming the filtered image data into the spatial domain. The filtered image data is input to the machine-learning model after the filter image data is transformed into the spatial domain. In other words, the filter is applied in the frequency domain to suppress the adversarial perturbations that are observable in the frequency domain.

For example, the filter may be multiplied with the image data in the frequency domain. The filter may be configured to suppress a subset of frequencies that are indicative of adversarial perturbations. As mentioned above, the subset of frequencies may occur to a grid-like pattern in the frequency domain.

In some examples, the subset of frequencies that are indicative of adversarial perturbations may occur according to one or more regular patterns in the frequency domain. For example, the one or more regular patterns may form a grid in the frequency domain.

In some examples, the filter is a Wiener filter being adapted to suppress adversarial perturbations within the image data. Wiener filters have been found to be suitable for suppressing the adversarial perturbations, and are available in many image-processing frameworks.

In some examples, the filter is based on a plurality of types of adversarial perturbations. In other words, the filter may be designed such that it removes adversarial perturbations that originate from different sources, so that a single Wiener filter can be applied regardless of the source of the adversarial perturbations.

As has been mentioned above, the proposed configurations disclosed herein is of particular interest in the processing of image data in a vehicle. Accordingly, the image data may be image data of a camera sensor of a vehicle. The machine-learning model may be configured to perform object detection or image segmentation for use in a driving assistance feature of the vehicle. However, this kind of (Wiener) filter can also be used in other use cases outside of automated driving (for example, in biomedical applications, image classification tasks, etc.) Technically, any machine learning model which is susceptible to adversarial attacks can be a use case for (Wiener) filtering based denoising. Accordingly, for different model types, the computed filters may be different, but they work well across many attacks.

In some examples, the method comprises detecting a presence of adversarial perturbations based on a comparison between the image data and the filtered image data. For example, if the application of the filter causes changes that surpass a pre-defined threshold, a presence of adversarial perturbations may be assumed.

Various aspects of the present disclosure relate to a corresponding system for processing image data. In some examples, the system comprises an interface and one or more processing devices. The system is configured to obtain the image data via the interface, and transform the image data into the frequency domain. The system is further configured to apply a filter on the image data in the frequency domain to generate filtered image data. The filter is configured to suppress adversarial perturbations within the image data. The filter is a Wiener filter being adapted to suppress adversarial perturbations within the image data. The system is configured to transform the filtered image data into the spatial domain, and to process the filtered image data using a machine-learning model. The filtered image data is input to the machine-learning model after the filter image data is transformed into the spatial domain.

Various aspects of the present disclosure further provide a vehicle comprising the system disclosed herein. The system is configured to process the image data to perform object detection or image segmentation for use in a driving assistance feature of the vehicle.

In some examples, a method is disclosed for generating a filter for suppressing adversarial perturbations within image data. The method comprises obtaining a plurality of sets of images. Each set comprises a first image and a second image. The first image is an image without adversarial perturbations and the second image is a corresponding image with adversarial perturbations. The method comprises transforming the plurality of sets of images into the frequency domain. The method comprises determining a difference between the first image and second image of each set in the frequency domain. The difference is indicative of the adversarial perturbations. The method comprises generating the filter based on a combination of the differences between the first and second images across the plurality of sets of images. For example, the above method may be used to generate suitable filters for application in the method or system for processing image data.

As mentioned above, the adversarial perturbations may occur according to one or more regular patterns in the frequency domain. The filter may be configured to suppress image data according to the one or more regular patterns in the frequency domain. In other words, adversarial perturbations often occur according to a pattern (in the frequency domain), and may thus be suppressed according to the pattern.

For example, the plurality of sets of images may represent a plurality of types of adversarial perturbations. Accordingly, the generated filter may be used to deal with different types of adversarial perturbations.

In some embodiments, each set of images may be associated with a weighting factor. The differences between the first and second images of each set of images may be combined according to the associated weighting factor. For example, the filter may be design with a focus on certain types of adversarial perturbations.

In some examples, a system is disclosed for generating a filter for suppressing adversarial perturbations within image data. The system comprises an interface and one or more processing devices. The system may be configured to obtain a plurality of sets of images, each set comprising a first image and a second image. The first image is an image without adversarial perturbations and the second image is a corresponding image with adversarial perturbations. The system is configured to transform the plurality of sets of images into the frequency domain. The system is configured to determine a difference between the first image and second image of each set in the frequency domain. The difference is indicative of the adversarial perturbations. The system is configured to generate the filter based on the differences between the first and second images of each set of images.

Various aspects of the present disclosure relate to a corresponding computer program having a program code for performing at least one of the methods, when the computer program is executed on a computer, a processor, or a programmable hardware component.

BRIEF DESCRIPTION OF THE DRAWINGS

Some other features or aspects will be described using the following non-limiting embodiments of apparatuses or methods or computer programs or computer program products by way of example only, and with reference to the accompanying figures, in which:

FIG. 3c shows a table of a comparison of SSIM and MSE metrics with and without denoising for the ICNet model trained on the Cityscapes dataset according to some aspects of the present disclosure;

FIG. 3d shows a table of a comparison of mIoU (in %) with and without denoising for the ICNet model trained on the Cityscapes dataset according to some aspects of the present disclosure;

FIG. 3e shows a comparison of mIoU (in %) with and without denoising for the FCN model trained on the Cityscapes dataset according to some aspects of the present disclosure;

FIG. 3f shows a table of attack parameters used according to some aspects of the present disclosure;

FIG. 3g shows the method parameters used for the evaluation according to some aspects of the present disclosure;

DETAILED DESCRIPTION

Figure 1A:
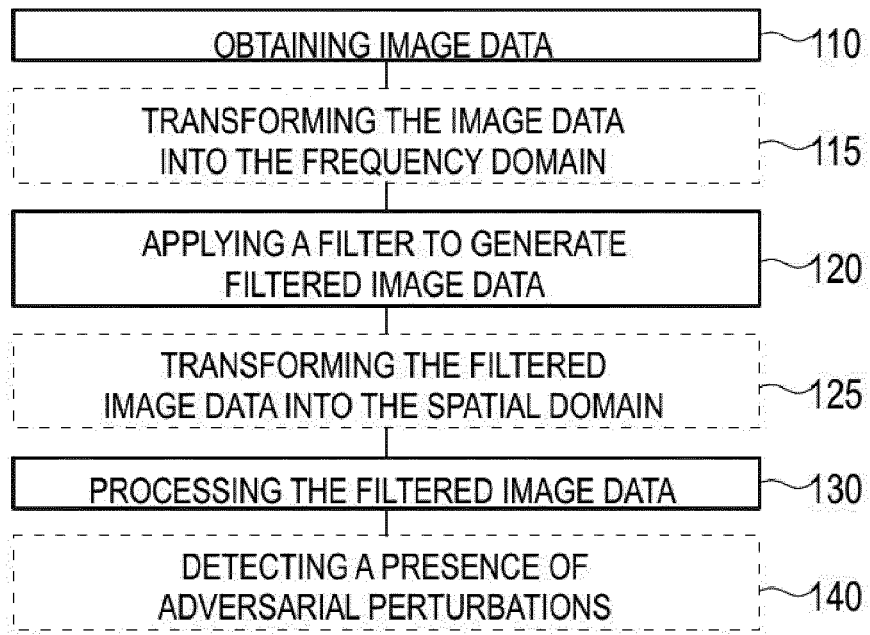
FIG. 1a shows a flow chart of a method for processing image data according to some aspects of the present disclosure.

Various exemplary embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while exemplary embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the present disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Various aspects of the present disclosure relate to a method for countering adversarial examples, e.g., using Wiener filtering.

Various aspects of the present disclosure are based on the observation that harmful interference for neural networks usually shows conspicuous frequency patterns. These patterns can be found in the Fourier space and thus allow (also in the Fourier space) a construction of robustness specific filters, which suppress harmful frequencies specifically. The 2-dimensional Discrete Fourier Transformation is only one possibility, other 1- or 2-dimensional transformations are conceivable, such as the Discrete Cosine Transformation or Wavelet Transformation. The robustness of the neural networks and thus of the downstream perception functions can be effectively and time-savingly increased by preprocessing the incoming sensor data by means of the learned filter. More precisely, the procedure according to the present disclosure may be implemented using an extension and adaptation of already known Wiener filters (classically known from the domain of photo denoising) to additive (i.e. added, for example adversarial) perturbances.

In some examples, Wiener filters may be calculated for a series of attacks on a given function for a set of test images. (data aggregation step 1). For this purpose, different adversarial attacks on a relevant set of test patterns are calculated for a perception function and applied. Here, the variety of attacks is more relevant than the variety of test data.

Subsequently, the corresponding Wiener filters are calculated for each attack and stored with the corresponding metadata (data sample, attack, meta-parameters, potential attack success) (calculation step 2).

Then a common filter is calculated from the calculated filters (aggregation step 3). This can be done on the basis of simple averaging (arithmetic, geometric, harmonic mean) or based on weighted averages (for example, based on the success of the attack or the security relevance of the attack).

The filter determined in this way can then be incorporated as a data pre-processing step in the execution of the perception function (inference step 4).

It is possible to perform "fine-tuning", i.e., to continue training of the perceptual function as an intermediate step based on training data processed by the filter (training step 3*a*). In this case, existing technologies for the robustification of neural networks can be added for fine-tuning.

An iterative procedure (step sequence 1-2-3-3*a*-1-2-3-3*a* . . . ) is also possible. Here, the iterative procedure would be terminated if the attacks in step 1 are either sufficiently ineffective or only effective in strong execution (strong change of input data). Corresponding threshold values then represent setting parameters for the iterative procedure.

The development of a specific image filter (specific for the perceptual function and/or the selection of image perturbations) with the goal of increasing the robustness of neural networks is a novel concept, as is the method for determining the filters. The technologies and techniques disclosed herein allow a robustification of neural networks which has a very small influence on the latencies in the field (the run-time properties hardly change by switching on the filter in the data preprocessing).

Figure 1B:
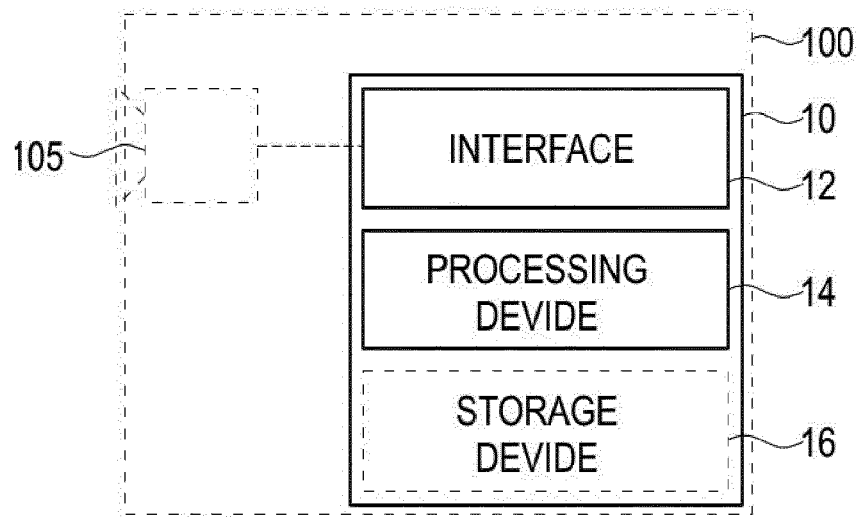
FIG. 1b shows a block diagram of a system for processing image data and of a vehicle comprising a system according to some aspects of the present disclosure.
Figure 1C:
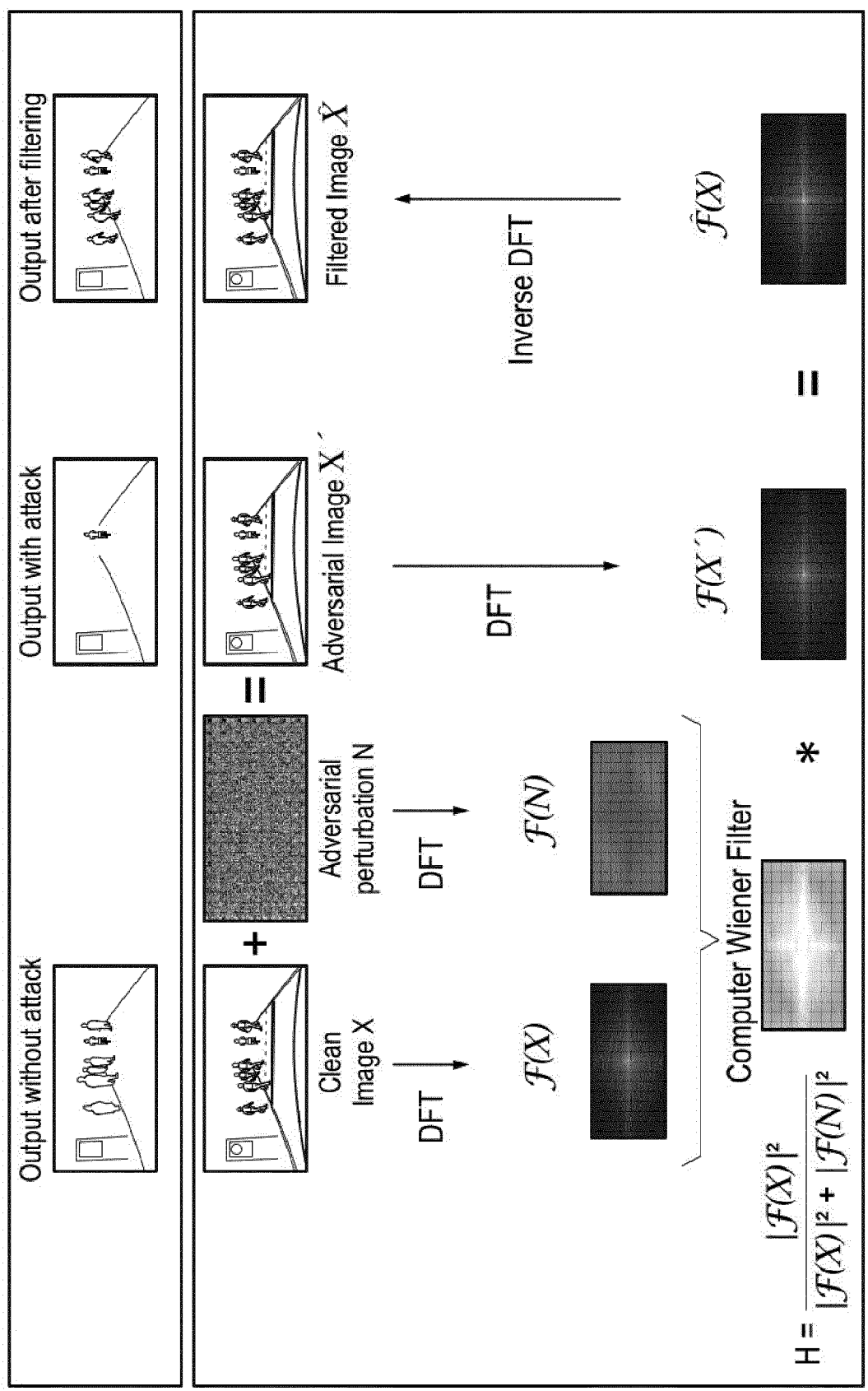
FIG. 1c shows a schematic diagram of an image processing system according to some aspects of the present disclosure.

The generated filter may be applied, for example, in the examples shown in connection with FIGS. 1*a* to 1*c*.

FIG. 1*a* shows a flow chart of a method, e.g., a computer-implemented method, for processing image data. The method comprises obtaining 110 the image data. The method comprises applying 120 a filter on the image data to generate filtered image data. The filter is configured to suppress adversarial perturbations within the image data. The method comprises processing 130 the filtered image data using a machine-learning model.

FIG. 1*b* shows a block diagram of a corresponding system 10 for processing the image data, and of a vehicle 100 comprising such a system 10. The system comprises an interface 12 and one or more processing devices 14. Optionally, the system comprises one or more storage devices 16. The one or more processing devices 14 are coupled to the interface 12 and to the optional one or more storage devices 16. In general, the functionality of the system 10 is provided by the one or more processing devices, in conjunction with the interface (for exchanging information, such as the image data, the filtered image data or an output of the machine-learning model) and/or the optional one or more storage devices (e.g., for storing information, such as the machine-learning model). In general, the system is configured to perform the method of FIG. 1*a*. For example, the system is configured to obtain the image data via the interface. The system is configured to apply the filter on the image data to generate the filtered image data. The filter is configured to suppress adversarial perturbations within the image data. The system is configured to process the filtered image data using a machine-learning model.

FIG. 1*b* further shows the vehicle 100 comprising the system. In this case, the system may be configured to process the image data to perform object detection or image segmentation for use in a driving assistance feature (e.g., an autonomous or semi-autonomous driving operation) of the vehicle.

The following description relates to the method of FIG. 1*a* and to the corresponding system of FIG. 1*b*.

Various aspects of the present disclosure relate to a method, system and computer program for processing image data. In general, the image data may be image data to be processed by a machine-learning model, e.g., in order to perform image segmentation or object detection on the image data. For example, the image data may be provided by a camera, such as a camera 105 of the vehicle 105. In general, the image data may be provided as a stream of image data comprising a plurality of samples of the image data. The image data may be processed by the method, system and computer program by applying the filter on the image data and providing the image data to a machine-learning model for processing. Accordingly, the application of the filter may be a pre-processing step before the image data is provided to the machine-learning model. For example, the image data may be processed in real-time, e.g. as it is generated by the respective camera.

The method comprises applying 120 the filter on the image data to generate filtered image data. In general, the filter has a purpose: In this example, the filter is configured to suppress adversarial perturbations within the image data. In general, adversarial perturbations may be artificial alterations of the image data that are added to the image data by a malicious (i.e., adversarial) actor. This may occur either after generation of the image data, e.g., through a post-processing step that may be based on another machine-learning model, or the image data may be manipulated by a malicious actor that superimposes the adversarial perturbations over the field of view of the camera used for obtaining the image data.

As has been outlined above, various aspects of the present disclosure are based on the finding that such adversarial perturbations show a frequency pattern that can be recognized in the frequency domain. Accordingly, the filter may be applied in the frequency domain. In other words, the method may comprise transforming 115 the image data into the frequency domain (e.g., using a Fourier transformation). The method may comprise applying 120 the filter on the image data in the frequency domain.

In the frequency domain, in images with adversarial perturbations, a subset of frequencies may stand out, as the subset of frequencies shows an increased amplitude due to the adversarial perturbations being added to the image data. In other words, if the image comprises adversarial perturbations, the subset of frequencies may show an increased amplitude. To suppress the adversarial perturbations, this subset of frequencies may be suppressed. For example, the filter may be multiplied with the image data in the frequency domain, with the filter being configured to suppress a subset of frequencies that are indicative of adversarial perturbations (i.e. that are likely to show an increased amplitude in images with adversarial perturbations). This subset of frequencies that are indicative of adversarial perturbations may occur according to one or more regular patterns in the frequency domain. For example, the subset of frequencies may occur according to one or more grids in the frequency domains (e.g., as shown in FIGS. 3a and 3j-m), according to one or more pre-defined two-dimensional patterns. Patterns in the frequency domain may not necessarily be in a grid fashion only, but grid-like patterns are artifacts of signal processing via different processing layers of a CNN (Convolutional Neural Network). Primarily upsampling layers (bilinear, nearest neighbor) tend to leave grid-based artifacts. So different networks may leave different artifacts, which can all be captured via Wiener filters and used as a denoising method. In various aspects, these one or more patterns may be suppressed by the filter in order to suppress possible adversarial perturbations.

For example, one type of filter that is suitable for the task are so-called Wiener filters. In other words, the filter may be a Wiener filter that is adapted to suppress adversarial perturbations within the image data, e.g. that is adapted to suppress the subset of frequencies within the image data. Wiener filters are based on a statistical approach to filtering additive noise to recover an unknown signal of interest from a known signal. In the context of the present disclosure, the image data is the known signal, and the adversarial perturbations are the additive noise. As the adversarial perturbations have a known spectral characteristics (i.e. the subset of frequencies that are indicative of adversarial perturbations), the subset of frequencies may be used to generate the filter that is suitable for suppressing adversarial perturbations.

In some examples, more than one type of adversarial perturbation may be considered. For example, a filter may be generated that can deal with a plurality of types of adversarial perturbations (i.e. a plurality of grids in the frequency domains). Accordingly, the filter may be based on a plurality of types of adversarial perturbations.

In FIG. 1c, a schematic diagram of the proposed configuration is shown (with respect to a Wiener filter being used). For the discrete Fourier transform F (X) of an unperturbed image (data) X and a perturbed (with a source of interference N loaded image X'=X+N) the Wiener filter is calculated by the formula $$H = \frac{|F(X)|^2}{|F(X)|^2 + |F(N)|^2}.$$

The formula is to be understood pixelwise in Fourier space, wherein $|z|^2$ denotes the square of the magnitude of a complex number z, and approximates a corresponding expected value. Other common ways of approximating expected values are also possible, such as, for example, when using sequential data (video), the temporal shifting of the $|z|^2$ term by means of a first-order IIR filter (IIR: infinite impulse response length). H in the above formula may be calculated separately for each attack (i.e., type of adversarial perturbation) and each image and then combined in the aggregation step. The result is an aggregated filter H*.

The filtered image and thus robustly modified image (result of the data preprocessing) may then be processed by matrix multiplication of the disturbed image (understood as matrix) calculated with the Inverse Discrete Fourier Transform of H*. This is also called a 2-dimensional convolution. Alternatively, a multiplication in the frequency domain can be performed, followed by an Inverse Discrete Fourier Transform.

In principle, the method already works very well without requiring the training step 3, and is a highly robust method that has almost no effect on performance on undisturbed images and has no significant influence on the runtime characteristics of the function.

In various embodiments, the machine-learning model may be trained to accept the filtered image data in a spatial domain representation. Accordingly, the method may comprise transforming 125 the filtered image data into the spatial domain (using an inverse Fourier transformation). The filtered image data may be input to the machine-learning model after the filter image data is transformed into the spatial domain.

The method comprises processing 130 the filtered image data using a machine-learning model. Machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and associated training content information, the machine-learning model "learns" to recognize the content of the images, so the content of images that are not included of the training images can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model.

Machine-learning models are trained using training input data. The examples specified above use a training method called "supervised learning". In supervised learning, the machine-learning model is trained using a plurality of training samples, wherein each sample may comprise a plurality of input data values, and a plurality of desired output values, i.e., each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm, e.g., a classification algorithm, a regression algorithm or a similarity learning algorithm. Classification algorithms may be used when the outputs are restricted to a limited set of values, i.e., the input is classified to one of the limited set of values. Regression algorithms may be used when the outputs may have any numerical value (within a range). Similarity learning algorithms are similar to both classification and regression algorithms, but are based on learning from examples using a similarity function that measures how similar or related two objects are.

In general, the machine-learning model may be trained to process the filtered image data. For example, the machine-learning model may be suitable for, i.e., trained for, performing image segmentation on the filtered image data, or to perform objection detection. For example, the image data may be image data of a camera sensor 105 of the vehicle 100. For example, the machine-learning model is configured to perform object detection or image segmentation for use in a driving assistance feature of the vehicle. Alternatively, the machine-learning model may be configured to perform objection detection in another domain, e.g., in medical image processing.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge, e.g., based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e., to achieve a desired output for a given input. In at least some embodiments, the machine-learning model may be deep neural network, e.g., a neural network comprising one or more layers of hidden nodes (i.e., hidden layers), prefer-ably a plurality of layers of hidden nodes.

In some cases, it may be useful to determine, whether a particular sample of image data contains adversarial perturbations. Accordingly, the method may comprise detecting 140 a presence of adversarial perturbations based on a comparison between the image data and the filtered image data. For example, if a difference between the image data and the filtered image data exceeds a threshold, the image data may be deemed to contain adversarial perturbations.

The interface 12 may correspond to one or more inputs and/or outputs for receiving and/or transmitting information, which may be in digital (bit) values according to a specified code, within a module, between modules or between modules of different entities. For example, the interface 12 may comprise interface circuitry configured to receive and/or transmit information.

In embodiments the one or more processing devices 14 may be implemented using one or more processing units, one or more processing devices, any means for processing, such as a processor, a computer or a programmable hardware component being operable with accordingly adapted software. In other words, the described function of the one or more processing devices 14 may as well be implemented in software, which is then executed on one or more programmable hardware components. Such hardware components may comprise a general-purpose processor, a Digital Signal Processor (DSP), a micro-controller, etc.

In at least some embodiments, the one or more storage devices 16 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the method, system and computer program for processing image data are mentioned in connection with the proposed configuration or one or more examples described above or below (e.g., 2a to 31). The method, system and computer program for processing image data may comprise one or more additional optional features corresponding to one or more aspects of the proposed configuration or one or more examples described above or below.

Figure 2A:
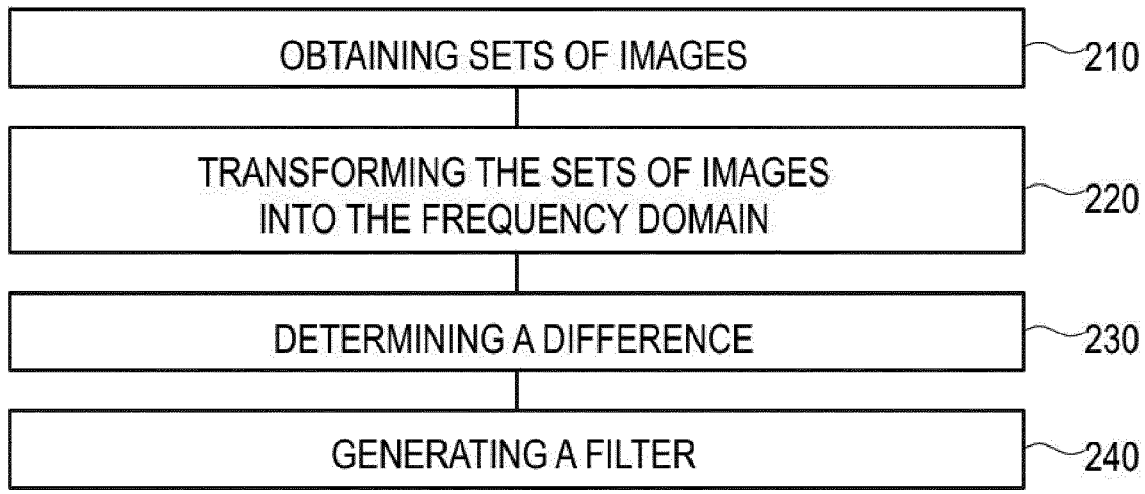
FIG. 2a shows a flow chart of a method for generating a filter according to some aspects of the present disclosure.

FIG. 2a shows a flow chart of a (computer-implemented) method for generating a filter, i.e., a filter for suppressing adversarial perturbations within image data. The method comprises obtaining 210 a plurality of sets of images. Each set comprises a first image and a second image. The first image is an image without adversarial perturbations and the second image is a corresponding image with adversarial perturbations. The method comprises transforming 220 the plurality of sets of images into the frequency domain. The method comprises determining 230 a difference between the first image and second image of each set in the frequency domain. The difference is indicative of the adversarial perturbations. The method comprises generating 240 the filter based on a combination of the differences between the first and second images across the plurality of sets of images.

Figure 2B:
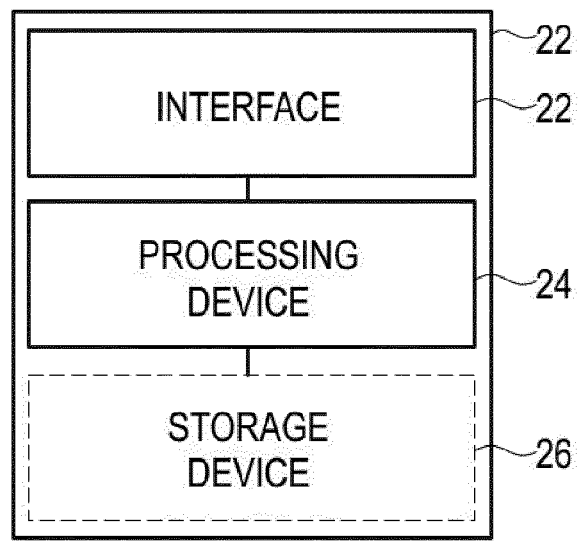
FIG. 2b shows a block diagram of a system for generating a filter according to some aspects of the present disclosure.

FIG. 2b shows a block diagram of a corresponding system 20 for generating a filter for suppressing adversarial perturbations within image data. The system 20 comprises an interface 22 and one or more processing devices 24. Optionally, the system comprises one or more storage devices 26. The one or more processing devices 24 are coupled to the interface 22 and to the optional one or more storage devices 26. In general, the functionality of the system 20 is provided by the one or more processing devices, in conjunction with the interface (for exchanging information, such as the sets of images and the filter) and/or the optional one or more storage devices (e.g., for storing information, such as the sets of images). In general, the system is configured to perform the method of FIG. 2a. For example, the system is configured to obtain the plurality of sets of images, each set comprising a first image and a second image. The first image is an image without adversarial perturbations and the second image is a corresponding image with adversarial perturbations. The system is configured to transform the plurality of sets of images into the frequency domain. The system is configured to determine the difference between the first image and second image of each set in the frequency domain. The difference is indicative of the adversarial perturbations. The system is configured to generate the filter based on the differences between the first and second images of each set of images.

The following description relates to the method of FIG. 2a and to the corresponding system of FIG. 2b.

Various aspects of the present disclosure relate to a method, system and computer program for generating a filter for suppressing adversarial perturbations within image data. For example, the method, system and computer program may be suitable for generating a filter for use with the method, system and computer program of FIG. 1a.

The method comprises obtaining 210 the plurality of sets of images. In order to determine the changes caused by the different types of adversarial perturbations, sample images may be obtained. For example, the plurality of sets of images may represent (i.e., cover) a plurality of types of adversarial perturbations. For example, for each type of adversarial perturbation, the plurality of sets of images may comprise at least one set of images.

The sets of images comprise two images each-one image without the adversarial perturbations, and one with the adversarial perturbations. For example, the sets of images may be generated using one of the known frameworks for generating adversarial images, e.g., one of the frameworks that are introduced in connection with FIGS. 3a to 3l.

The method comprises transforming 220 the plurality of sets of images into the frequency domain (e.g., using a Fourier transform). In the frequency domain, the differences between the images of the sets of images may become apparent. Accordingly, the method comprises determining 230 the difference between the first image and second image of each set in the frequency domain. For example, each type of adversarial perturbation may lead to a characteristic subset of frequencies that stand out from a representation of the images in the frequency domain. For example, the method may comprise extracting the subset of frequencies that differ between the first image and the second image of each set in the frequency domain. By determining that subset of frequencies, over the plurality of sets of images, a combined subset of frequencies may be compiled that are indicative of adversarial perturbations. For example, the adversarial perturbations may occur according to one or more regular patterns in the frequency domain, e.g., at the subset of frequencies. This subset of frequencies may be subsequently used to generate the filter. For example, the filter may be configured to suppress image data according to the one or more regular patterns in the frequency domain.

The method comprises generating 240 the filter based on a combination of the differences between the first and second images across the plurality of sets of images. For example, the filter may be a Wiener filter. As has been mentioned in connection with FIG. 1c, for the discrete Fourier transform F (X) of an unperturbed image X (i.e. the first image of a set) and a perturbed image (with a source of interference N loaded image, i.e. the second image of a set) X'=X+N, the Wiener filter is calculated by the formula $$H = \frac{|F(X)|^2}{|F(X)|^2 + |F(N)|^2}.$$

The formula is to be understood pixelwise in Fourier space, wherein $|z|^2$ denotes the square of the magnitude of a complex number z, and approximates a corresponding expected value. Other common ways of approximating expected values are also possible, such as, for example, when using sequential data (video), the temporal shifting of the $|z|^2$ term by means of a first-order IIR filter (IIR: infinite impulse response length). H in the above formula may be calculated separately for each attack (i.e., type of adversarial perturbation) and each image (or rather sets of images) and then combined in an aggregation step. The result is an aggregated filter H*.

For example, the filter may be an aggregate filter that is generated over a plurality of sets of images, and, optionally, a plurality of types of adversarial perturbations. In some cases, it may be desired to generate a filter that provides a stronger suppression of adversarial perturbations of a first type (e.g., because that type of adversarial perturbations occurs more often) than of adversarial perturbations of second first type. In this case, each set of images may be associated with a weighting factor. The differences between the first and second images of each set of images may be combined according to the associated weighting factor, e.g., in order to take some types of adversarial perturbations more into account.

The interface 22 may correspond to one or more inputs and/or outputs for receiving and/or transmitting information, which may be in digital (bit) values according to a specified code, within a module, between modules or between modules of different entities. For example, the interface 22 may comprise interface circuitry configured to receive and/or transmit information.

In embodiments the one or more processing devices 24 may be implemented using one or more processing units, one or more processing devices, any means for processing, such as a processor, a computer or a programmable hardware component being operable with accordingly adapted software. In other words, the described function of the one or more processing devices 24 may as well be implemented in software, which is then executed on one or more programmable hardware components. Such hardware components may comprise a general-purpose processor, a Digital Signal Processor (DSP), a micro-controller, etc.

In at least some embodiments, the one or more storage devices 26 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the method, system and computer program for generating a filter are mentioned in connection with the proposed configuration or one or more examples described above or below (e.g., la to 1c, 3a to 31). The method, system and computer program for generating a filter may comprise one or more additional optional features corresponding to one or more aspects of the proposed configuration or one or more examples described above or below.

In the following, the scientific foundation of the proposed concepts is shown, with a corresponding evaluation of the proposed concept. The proposed concept is titled "From a Fourier-Domain Perspective on Adversarial Examples to a Wiener Filter Defense for Semantic Segmentation".

Despite recent advancements, deep neural networks (DNNs) may be considered not to be robust against carefully crafted adversarial perturbations. Many of the proposed adversarial defense approaches use computationally expensive training mechanisms that do not scale to complex real-world tasks such as semantic segmentation, and offer only marginal improvements. In addition, fundamental questions on the nature of adversarial perturbations and their relation to the network architecture are largely understudied. In this work, the adversarial problem is studied from a frequency domain perspective. More specifically, discrete Fourier transform (DFT) spectra of several adversarially attacked images are analyzed and two major findings are reported: First, there exists a strong connection between a model architecture and the nature of adversarial perturbations that can be observed and addressed in the frequency domain. Second, the observed frequency patterns are largely image- and attack-type independent, which is important for the practical impact of any defense making use of such patterns. Motivated by these findings, an adversarial defense method is proposed based on Wiener filters that capture and suppress adversarial frequencies in a data-driven manner. The proposed method not only generalizes across unseen attacks but also beats five state-of-the-art denoising methods by a large margin, across two models FCN and ICNet.

Recent advancements in deep neural networks (DNNs) have enabled significant progress in many real-world computer vision tasks, such as image classification, semantic segmentation, and object detection. However, Szegedy et al.: "Intriguing Properties of Neural Networks" (2014) pointed out that these state-of-the-art machine learning models can be fooled by adding carefully crafted adversarial perturbations to the input. Although these so-called adversarial examples are often imperceptible, they may cause the model to make erroneous predictions with a high confidence. Since then, significant research efforts have been made in trying to get a deeper understanding into the existence of such adversarial attacks, and in building reliable defense methods against such attacks.

At present, most existing defense methods can be broadly categorized into three major categories. The first category is called adversarial training, where adversarial examples are produced and included into the training data of the target network. However, this approach is computationally expensive and typically offers improvements only to the attacks it was trained on. The second category is called gradient masking, a term coined by Papernot et al.: "Distillation as a Defense to Adversarial Perturbations Against Deep Neural Networks" (2016), where the gradients of the target neural network are masked such that they are not accessible to the adversary. However, as pointed out by Athalye et al.: "False Sense of Security: Circumventing Defenses to Adversarial Examples" (2018), these approaches are largely considered ineffective. The third category is called input transformations, a term coined by Xu et al. "Feature Squeezing: Detecting Adversarial Examples in Deep Neural Networks" (2018), where the input is pre-processed such that the adversarial perturbations are removed before the image is fed into the model.

While some of these methods offer improvements and guarantees under certain conditions, a deep conceptual understanding of the problem at hand may be desired. As of today, an arm's race game is played between an attacker and a defender. Fundamental questions on the nature of adversarial perturbations, transferability of adversarial attacks across multiple model architectures, limitations and certifications of existing defense methods are still unanswered. Additionally, since most of the current defense methods are only evaluated on small data sets for image classification, such as CIFAR-10 and CIFAR100 (A. Krizhevsky: "Learning Multiple Layers of Features from Tiny Images" (2009)), there is always the question of their transferability to complex tasks such as semantic segmentation.

To obtain certifiable, effective, and low-complex defense methods, the focus may be shifted towards answering fundamental questions to improve the understanding of this problem. For example, Assion et al.: "The Attack Generator: A Systematic Approach Towards Constructing Adversarial Attacks" (2018) made significant advancements in understanding adversarial attacks by proposing a structured taxonomy, specifying key components of an attack. In addition, recently Yin et al.: "A Fourier Perspective on Model Robustness in Computer Vision" (2019) looked at the robustness problem from a frequency-domain perspective to get a better understanding of trade-offs between corruption types and data augmentation methods.

In the context of the present disclosure, the different adversarial attack types are analyzed deeper in a frequency-domain formulation. More specifically, adversarial perturbations are analyzed in in the discrete Fourier domain and several new insights are reported. Unlike existing analyses, this is done for a complex task, namely, for semantic segmentation.

Figure 3A:
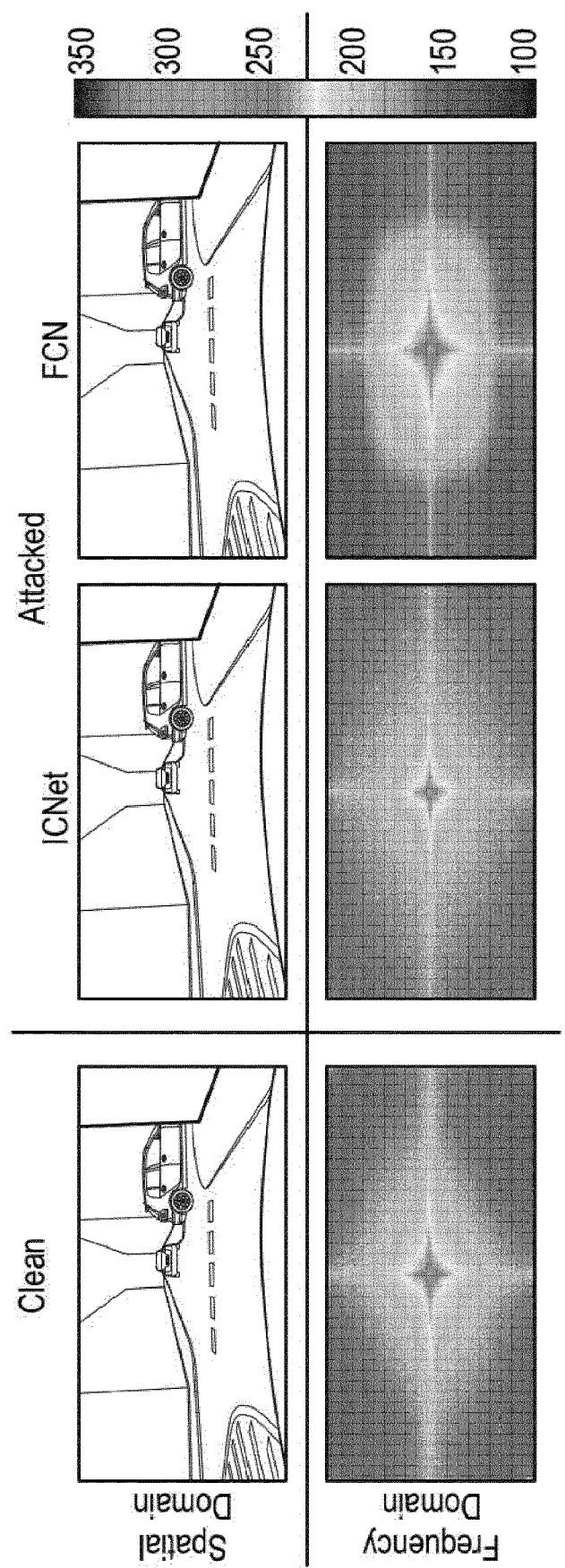
FIG. 3a shows a frequency spectra comparison of clean and attacked images according to some aspects of the present disclosure.

Through extensive experiments on multiple attacks, on two models and two data sets, it was observed that in the frequency domain, unlike in the spatial domain, adversarial examples can be better distinguished from clean images as they reveal visibly different frequency patterns. FIG. 3a shows a frequency spectra comparison of clean and attacked images.

Motivated by this finding, this phenomenon was investigated further to understand the origin of these patterns. The experiments revealed two major findings: First, there exists a strong connection between a model architecture and the nature of adversarial perturbations which can be observed and addressed in the frequency domain. Second, the observed adversarial patterns in the frequency domain are largely image- and attack-type-independent.

Motivated by these findings, the use the well-known Wiener filters, which have been used already for image and speech denoising, from an adversarial defense perspective is proposed. More specifically, a new type of input transformations defense method is proposed that aims to denoise adversarial examples by suppressing adversarial frequencies. The proposed method is compared with existing baseline input transformation methods that do not require any additional retraining, hence offering superior practical usage. The results indicate that Wiener filters provide a promising adversarial perturbation denoising method in comparison to existing approaches, operating in an image-agnostic as well as in an attack-agnostic way.

In summary, the proposed contributions are as follows: Firstly, the adversarial robustness problem is studies from a frequency-domain perspective and several new insights are reported. More specifically, from an experimental evaluation, it was observed that the network topology has a significant impact on the nature of adversarial perturbations that can be observed and approached in the frequency domain. Empirical evidence to support this finding is provided.

Secondly, the Wiener filters, a well-known denoising method, are adapted towards the adversarial defense problem, in an image- and attack-type agnostic way. Lastly, in comparison to other denoising methods tested on two models, the proposed approaches improve performance by an average 15.7% mIoU after denoising on attacked images while retaining more or less the performance on clean images.

The following sections are structured as follows. First, the related work the related work in the field of semantic segmentation, adversarial attacks and defenses is reviewed. Subsequently, the details of Wiener filtering from an adversarial defense perspective are described. In the following, the details of the experimental setups is described. Finally, the results and observations are described, and a conclusion is provided.

First, the related work in two fields, namely adversarial attacks and adversarial defense methods with a focus on denoising methods, is described.

Adversarial Attacks: Since the introduction of adversarial attacks by Szegedy et al.: "Intriguing Properties of Neural Networks" (2014), the robustness of neural networks has been questioned. Research has then evolved significantly and produced many new kinds of attack algorithms such as FGSM (J. Goodfellow et al.: "Explaining and Harnessing Adversarial Examples" (2016), DeepFool (Moosavi-Dezfooli et al.: "DeepFool: A Simple and Accurate Method to Fool Deep Neural Networks" (2016)), LLCM (Kurakin et al. "Adversarial Examples in the Physical World" (2017) and "Adversarial Machine Learning at Scale" (2017)), C&W (Carlini et al.: "Towards Evaluating the Robustness of Neural Networks" (2017)), MI-FGSM (Dong et al.: "Boosting Adversarial Attacks With Momentum" (2018)), and PGD (Madry et al.: "Towards Deep Learning Models Resistant to Adversarial Attacks" (2018).

Most of these attacks are evaluated on simpler tasks such as image classification. For complex tasks such as semantic segmentation, relatively fewer attacks have been published. Recently, Assion et al. "The Attack Generator: A Systematic Approach Towards Constructing Adversarial Attacks" (2018) published an attack generator, which outlines the key building blocks of developing an attack and showed that virtually unlimited attacks can be created for any machine learning model.

Adversarial Defenses: Adversarial defenses are mainly categorized into three types. The first category is called adversarial training, where adversarial examples are generated and added on to the training set of the network. Although successful, this approach is considered computationally expensive, and does not scale to large scale data sets or tasks. The second category is called gradient masking, a term coined by Papernot et al., where the main idea is to hide the gradients in a way that the attacker cannot decide in which direction to move, for the attack to succeed. However, Athalye et al. showed that none of these approaches are truly effective as an attacker can simply train another surrogate model whose gradients exist, and the attack would still be successful. The third category is called input transformations, where the main idea is to remove adversarial perturbations directly from the input before it is fed into the model. Xu et al. proposed a new strategy called feature squeezing where they propose to squeeze the inputs using different methods, such as non-local means (NLM) smoothing, bit-depth reduction and median smoothing, thereby reducing the search space available for an adversary and used this as an effective adversarial example detector.

Similarly, Dziugaite et al. evaluated the effect of JPEG compression on adversarial images and found that it worked well only up to a certain adversarial strength. For a strong perturbation, high compression rates were necessary, and this introduced unwanted block artifacts. Aydemir et al. then proposed JPEG2000 compression as an improvement over JPEG compression to address this issue.

In addition to these methods, Guo et al.: "Countering Adversarial Images Using Input Transformations" (2018) proposed two more methods, namely quilting and total variance minimization (TVM), which included a sense of randomness and are non-differentiable by nature, making it even harder for an adversary to produce adversarial perturbations. However, for both these methods, retraining on transformed images was deemed necessary.

Other approaches include image cropping, different forms of randomness, basis function transforms such as low pass filtering, PCA (Principal Component Analysis), soft thresholding etc., and more advanced methods such as pixel deflection, high-level guided denoiser, BlurNet and Saak transforms. In this disclosure, the use of Wiener filters as a denoising means that suppresses frequencies indicative of adversarial perturbations is proposed. In other words, Wiener Filters are proposed as adversarial defense.

Wiener filters are used as denoising filters in traditional signal processing. These filters are typically used to filter signals corrupted with different kinds of degradations, e.g., motion blur, defocus aberration, or additive noise.

In this section, an adaptation of the Wiener filter in a way that it can serve as an adversarial defense is proposed. This is done by estimating the power spectrum of the underlying adversarial perturbations in the frequency domain. First, some mathematical notation is introduced.

Let $x \in G^{H \times W \times C}$ be an image in the spatial domain with height H, width W, C=3 color channels, set of integer gray values G, and $x \in X$, where X represents a dataset. In the frequency domain, $X=(X_{k,l,m}) \in \mathbb{C}^{H \times W \times C}$ is defined, with $X_{k,l,m}$ being the element of X at frequency coordinates k, l, m along height, width, and color channels, respectively, and $\mathbb{C}$ denoting the set of complex-valued numbers. Further, X is obtained by computing the 3D discrete Fourier transform (DFT) following Gonzalez et al.: "Digital Image Processing" (2002) as $$X_{k,l,m} = \sum_{h=0}^{H-1} \sum_{w=0}^{W-1} \sum_{c=0}^{C-1} x_{h,w,c} e^{-j2\pi\left(\frac{k}{H}h + \frac{l}{W}w + \frac{m}{C}c\right)} \quad (1)$$

where, similarly to the frequency domain, $X_{h,w,c}$ are the elements of x at spatial coordinates h, w, c in height, width and color channels, respectively. For the sake of simplicity, the 3D DFT is denoted with the notation $X=F(x)$. Similarly, the 3D inverse DFT is denoted as $x=F^{-1}(X)$. For the sake of completeness, the 3D inverse DFT is defined as:

$$x_{h,w,c} = \sum_{k=0}^{H-1} \sum_{l=0}^{W-1} \sum_{m=0}^{C-1} X_{k,l,m} e^{j2\pi\left(\frac{h}{H}k + \frac{w}{W}l + \frac{c}{C}m\right)} \quad (2)$$

Figure 3B:
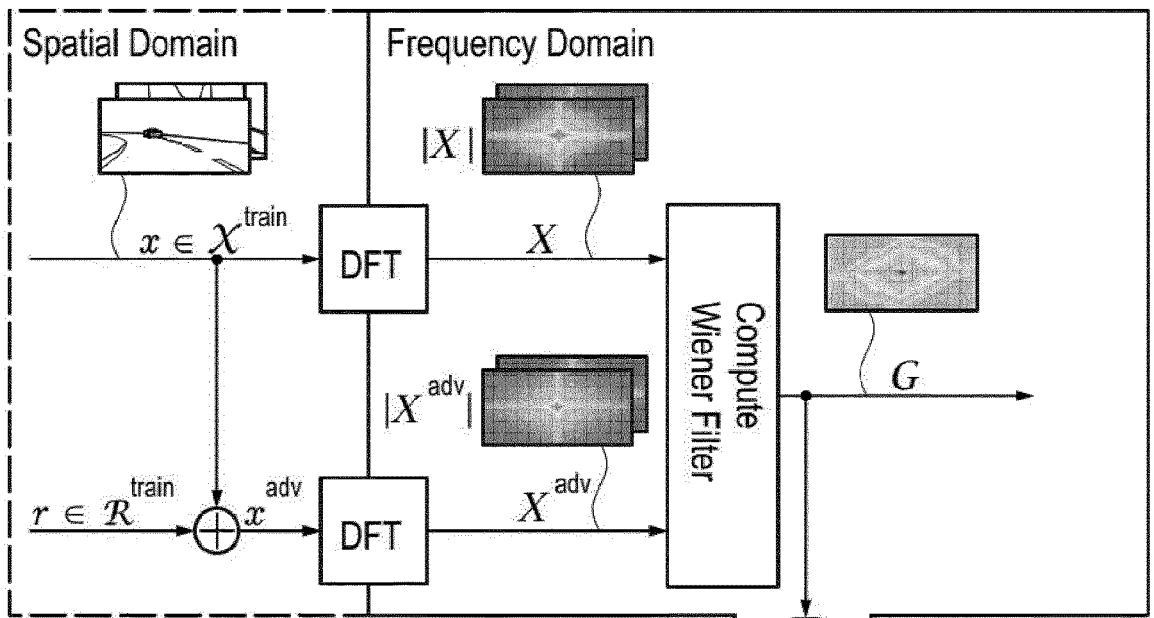
FIG. 3b shows an overview of a method according to some aspects of the present disclosure.
Figure 3B:
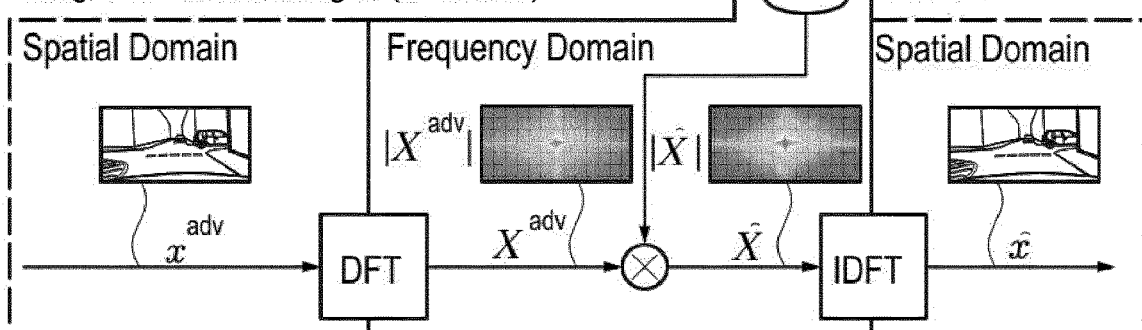

FIG. 3b shows a method overview. In stage 1, a Wiener filter is computed in the frequency domain using a paired set of images $x \in X^{train}$ taken from the training set $X^{train}$ with their respective adversarial perturbations r or rather their adversarial images $x^{adv}$. In stage 2, during inference, the Wiener filter G is applied as an input preprocessing step such that it suppresses adversarial frequencies (if present) in the frequency domain leading to a denoised image R in the spatial domain after an inverse DFT. Here, the depicted filter is computed for the Momentum FGSM attack on the ICNet (Zhao et al.: "ICNet for Real-Time Semantic Segmentation on High-Resolution Images" (2018)" model trained on the Cityscapes dataset (Cordts et al.: "The Cityscapes Dataset for Semantic Urban Scene Understanding" (2016)).

The image x is fed as an input to a semantic segmentation neural network $\mathfrak{F}(\cdot)$ having network parameters $\theta$ and output $y=\mathfrak{F}(x, \theta) \in [0,1]^{H \times W \times |S|}$, with the set of classes S, and |S| being the number of classes. Each element of y is considered to be a posterior probability $y_{i,s}=P(s|i,x)$ for the class $s \in S$ at pixel index $i \in I=\{1, 2, \ldots, H \cdot W\}$.

An adversarial attack comprises the computation of an adversarial perturbation $r \in \mathbb{R}^{H \times W \times C}$ such that $$\|r\|_p \leq \epsilon \quad (3)$$

with $\epsilon \in \mathbb{R}^+$ defined as an imperceptibility constraint based on the $L_p$ norm, denoted by $\|\cdot\|_p$. Following standard convention, p=2 and p=∞ are considered in this disclosure. Further, an adversarial example is defined as $$x^{adv}=x+r \quad (4)$$

These adversarial perturbations r can be computed for multiple images individually, creating a dataset R of adversarial perturbations with $r \in \mathcal{R}$.

In the following, the defense objection is introduced. In the absence of an adversarial attack detector, the aim may be at designing a denoising filter that removes an adversarial perturbation r from an adversarial image $x^{adv}$, and at the same time to the largest extent preserves the clean image x. Mathematically speaking, if the denoising function is denoted by $g(.): G^{H \times W \times C} \rightarrow G^{H \times W \times C}$, then the objective of denoising can be defined as $$\nabla x, x^{adv} : g(x)=x \land g(x^{adv})=x \quad (5)$$

A denoising function that satisfies the abovementioned properties has direct applications as an input preprocessing step during inference. Since the function g (.) will not alter a clean image x significantly, in contrast to an adversarial image $x^{adv}$, there might be a need to detect whether the input image is adversarial or not. In addition, the original baseline performance on clean filtered images should not suffer too much, since this filtering was not used during training the model.

Wiener filters were introduced in 1949 by N. Wiener ("Extrapolation, Interpolation, and Smoothing of Stationary Time Series") and are used since then primarily as a denoising and deblurring technique in traditional signal processing both for vision and speech. A Wiener filter can be used to suppress noise from a corrupted signal to provide an estimate of the underlying signal of interest using a statistical approach. These filters typically operate in the frequency domain and assume that the spectral properties of the original images as well as the noise are known or can be estimated.

In the context of adversarial attacks, the clean images x are considered as the original signal, which is corrupted by additive noise (also called adversarial perturbations r) giving a degraded output image $x^{adv}$. In the DFT domain, (4) can be written as $$\mathcal{F}(x^{adv})=\mathcal{F}(x)+\mathcal{F}(r), \quad (6)$$

where $\mathcal{F}(\cdot)$ is the 3D DFT computed from (1). A Wiener filter in the DFT domain typically results in a transfer function $G \in [0,1]^{H \times W \times C}$, such that the mean squared error $$J^{MSE}=E(\|\hat{X}-X\|_2^2) \quad (7)$$

between the estimated image in the DFT domain $\hat{X}$ and the original clean image X is minimized, with $E(\cdot)$ being the expectation operator. The following assumptions are made in the DFT domain: The perturbation $R=\mathcal{F}(r)$ and the image X are uncorrelated, zero mean, and the pixel values in the estimate $\mathcal{F}$ are a linear function of the pixel values in the degraded image $X^{adv}$. Based on these assumptions, the Wiener filter transfer function G in the DFT domain is computed by $$G_{k,l,m} = \frac{|X_{k,l,m}|^2}{|X_{k,l,m}|^2 + |R_{k,l,m}|^2} \quad (8)$$

where $G_{k,l,m}$ refers to the elements of G at frequency coordinates k, l, m respectively, and $|X_{k,l,m}|^2 + |R_{k,l,m}|^2$ refer to the power spectrum of the clean image and the additive noise, respectively. Given this filter, one could compute the denoised image in the DFT domain by $$\hat{X}=G \odot X^{adv} \quad (9)$$

where $\odot$ represents an element-wise multiplication. Finally, the denoised image in the spatial domain could be recovered by simply computing the inverse DFT (IDFT) as in (10):

$$\hat{x}=F^{-1}(\hat{X}) \quad (10)$$

Note that the filter defined in (8) is the classical Wiener filter formulation as knows from many applications. The challenge in real-world denoising applications is now to estimate the clean signal power spectrum and the noise power spectrum, or, alternatively, the signal-to-noise ratio $$SNR_{k,l,m} = \frac{|X_{k,l,m}|^2}{|R_{k,l,m}|^2} \quad (11)$$

allowing (8) to be rewritten as $$G_{k,l,m} = \frac{SNR_{k,l,m}}{1 + SNR_{k,l,m}} \quad (12)$$

For the proposed application, it has been determined that the filter defined in (8) optimally works for a single known image and known noise. In an experimental setting, where $X_{k,l,m}$ and $R_{k,l,m}$ are available separately, one can compute (8) and apply (9) and (10) to achieve an upper performance limit later on. For a real-world input transformation, however, this is adapted to unknown images in inference for an attack type a, by taking the arithmetic mean over multiple images from a training set $x \in X^{train} = X$ as follows $$G_{k,l,m}^{(a)} = \frac{1}{|X|} \sum_{x \in X} \frac{SNR_{k,l,m}^{(a)}}{1 + SNR_{k,l,m}^{(a)}} \quad (13)$$

with the superscript a referring to the respective attack type used for creating the perturbation $R_{k,l,m}^{(a)}$ to obtain $SNR_{k,l,m}^{(a)} = |X_{k,l,m}|^2/|R_{k,l,m}^{(a)}|^2$ and then to obtain the $G_{k,l,m}^{(a)}$ or $G^{(a)}$. This averaging approach is indeed novel and ambitious for combating adversarial perturbations, as it requires a similar SNR for different images at a particular DFT bin for a certain attack type a. Performing SNR match and mismatch experiments may play a crucial role later on. Similarly, filters from multiple attack types $a \in A$ from a set of attacks A may be combined to obtain a single Wiener filter $G^{(A)}$ with coefficients $$G_{k,l,m}^{(A)} = \frac{1}{|A|} \sum_{a \in A} G_{k,l,m}^{(a)}$$

Note that this Wiener filter computation is novel as well and even more ambitious, as the aforementioned assumptions leading to (13) are augmented by the assumption that the similar SNR even holds for different attack types. In other words, $SNR_{k,l,m}^{(a)}$ was expected for a certain network topology to be similar for various attack types $a \in A$.

In the "experimental setup" section, the data sets, models, metrics and adversarial attacks used for the experiments are described. Additionally, details of the baseline denoising methods that were used for comparison to the method are described.

A well-known publically available dataset for semantic segmentation was used, namely Cityscapes for all the experiments. The Cityscapes dataset contains 5000 RGB images with resolution 2048×1024×3 of urban street scenes from different cities across Germany. Following Cordts et al. the 33 classes were reduced to 19 relevant classes by excluding classes that are too rare. The data split comprises 2975 training images, 500 validation images, and 1525 test images. The results are reported on the validation set, since all the decisions are based only on the training set. Most importantly, all Wiener filters are always computed on images from the training set only.

In general, the training set images were always used for computing the Wiener filters to demonstrate its denoising potential on unseen images.

For a complex task of semantic segmentation, models with real-time capabilities offer superior practical usage. In the context of the present disclosure, two such models, namely ICNet and FCN are used. Zhao et al. proposed the ICNet model offering real-time capabilities with approximately 30 fps inference speed using images from the Cityscapes dataset with resolution 1,024×2,048 using only one Titan X Maxwell GPU. The ICNet model architecture is designed to extract multi-scale features using many down-sampling and upsampling layers by taking different scales of the image as inputs. The extracted multi-scale features are fused before being upsampled to obtain a full-resolution semantic segmentation mask. For the sake of reproducibility, an openly available implementation of the ICNet based on Tensorflow was used (H. Z. Yang: "TensorFlow Implementation of ICNet"). Long et al. proposed the FCN which was the basis for many further works on semantic segmentation architectures.

The architecture is built on top of classification networks such as VGG-16 where the fully connected layers are replaced by fully convolutional layers at the end. Such an architecture downsamples the input to a low resolution before upsampling it at the end to get a full-resolution segmentation map. For the research and evaluation of the proposed approach, the FCN was trained from scratch on Cityscapes dataset for 120 epochs with learning rate of 0.0001 and batch size 4 using two Nvidia GTX 1080Ti GPU's.

To better evaluate the denoising capabilities for different methods, results on the following metrics are additionally reported: Mean Squared Error (MSE): The mean squared error between the attacked image $x^{adv}$ and the attacked denoised image x was computed by $$MSE(x^{adv}, \hat{x}) = \frac{1}{HWC} \sum_{h=0}^{H-1} \sum_{w=0}^{W-1} \sum_{c=0}^{C-1} (x_{h,w,c}^{adv} - \hat{x}_{h,w,c})^2 \quad (15)$$

where h, w, c denote the indices of the images along height, width and channels, respectively. Additionally, the MSE between the clean image x as well as its clean filtered image x' was computed, which is computed by $x' = \mathcal{F}^{-1}(X')$ where $$X' = G \lfloor X \quad (16)$$

Structural Similarity Metric (SSIM): The structural similarity index metric (SSIM) was also computed according to Wang et al.: "Image Quality Assessment: From Error Visibility to Structural Similarity" (2004) on the attacked image $x^{adv}$ and the attacked denoised image $\hat{x}$ as follows $$SSIM(x^{adv}, \hat{x}) = [l(x^{adv}, \hat{x})]^\beta \cdot [c(x^{adv}, \hat{x})] \cdot [s(x^{adv}, \hat{x})]^\gamma \quad (17)$$

where ](.,.), c (.,.), s (.,.) are mathematical functions denoting a measure of luminosity, contrast, and saturation, respectively, and $\alpha$, $\beta$, $\gamma$ are weighting constants. The reader is referred to Wang et al.: "Image Quality Assessment: From Error Visibility to Structural Similarity." (2004) for detailed definitions of these functions. The SSIM values range from 0 (lowest) to 1 (highest). Similarly results on SSIM between the clean image x and the clean filtered image x are reported.

Mean Intersection over Union (mIoU): For semantic segmentation, mean intersection-over-union (mIoU) is commonly used to evaluate the performance of the network. It is computed by $$mIoU = \frac{1}{|S|} \sum_{s \in S} \frac{TP(s)}{TP(s) + FP(s) + FN(s)} \quad (18)$$

where TP(s), FP(s), FN(s) indicate class specific true positives, false positives and false negatives, respectively.

Figure 3H:
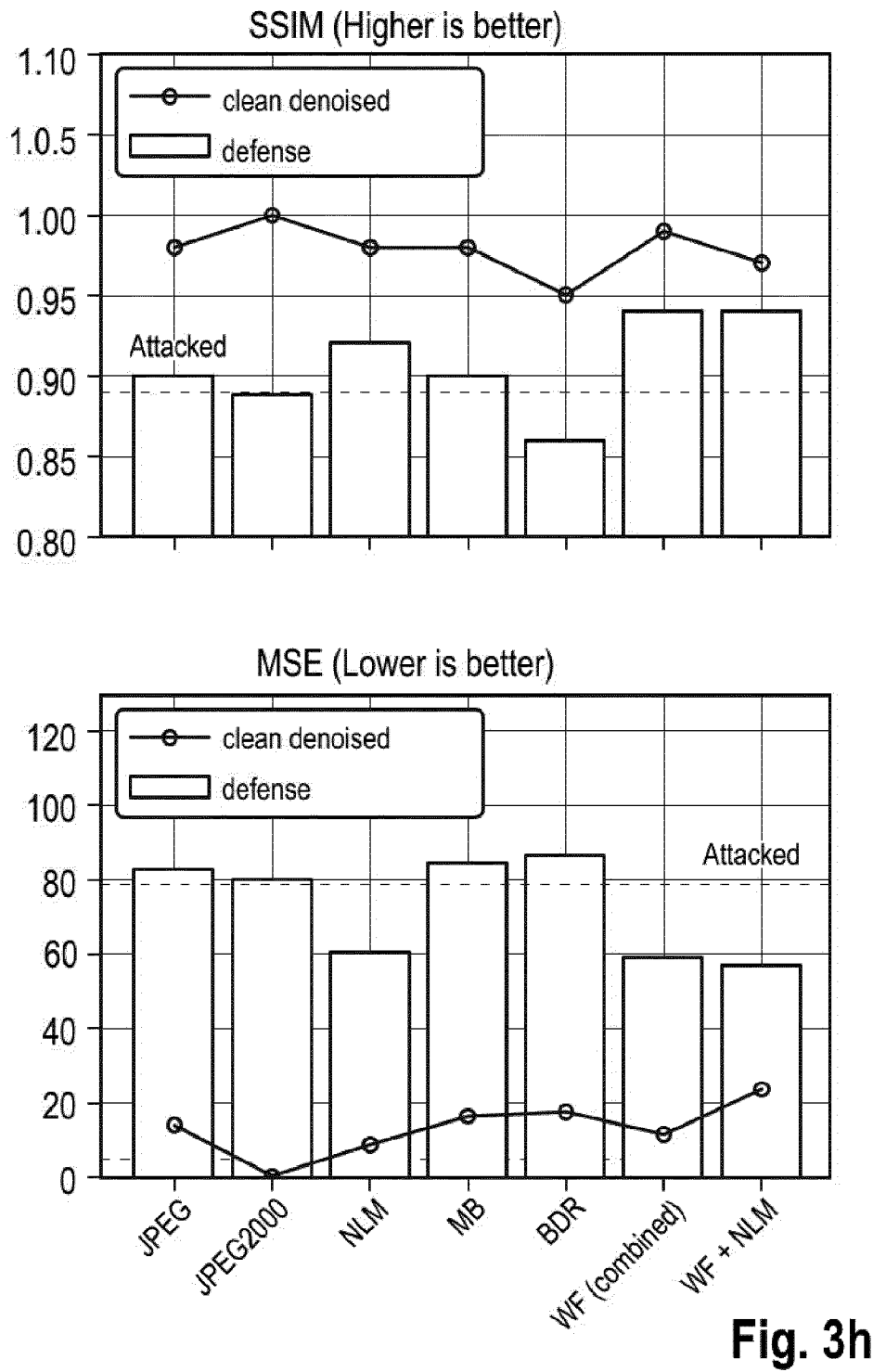
FIG. 3h shows SSIM and MSE results according to some aspects of the present disclosure.
Figure 3I:
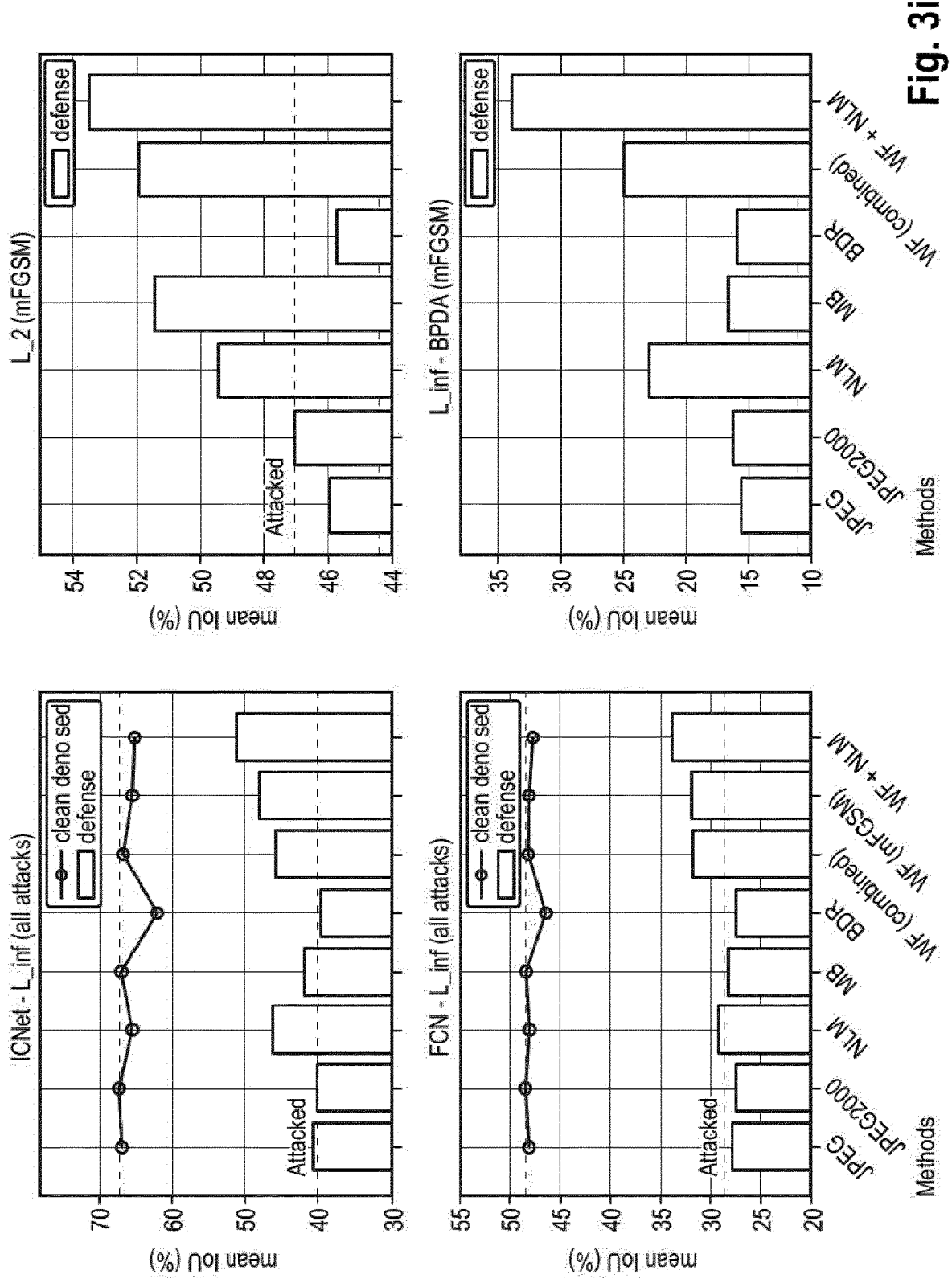
FIG. 3i shows mIoU results according to some aspects of the present disclosure.
Figure 3J:
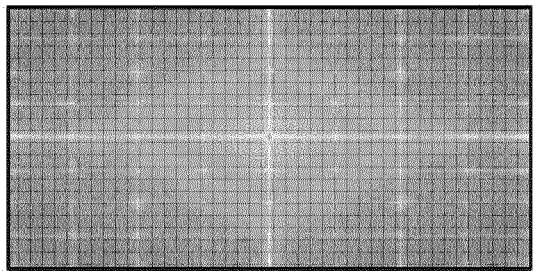
FIG. 3j show average amplitude spectra for different attacks according to some aspects of the present disclosure.
Figure 3J:
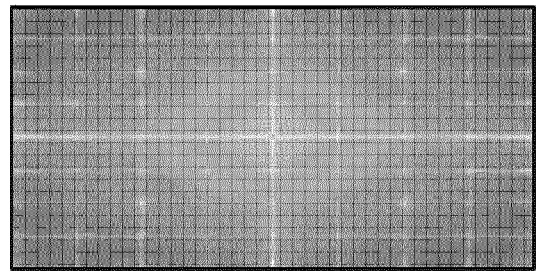
Figure 3J:
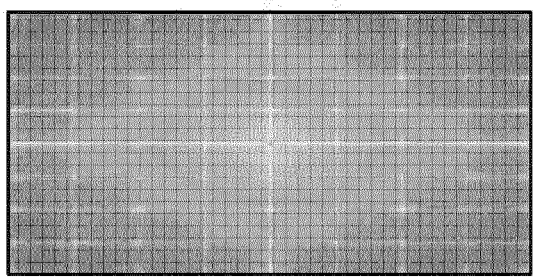
Figure 3J:
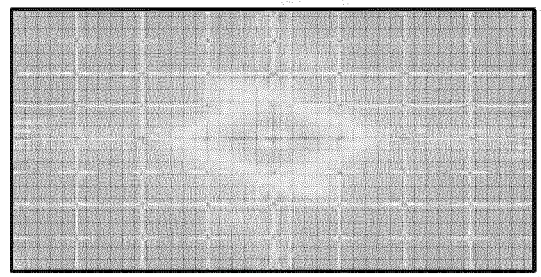
Figure 3J:
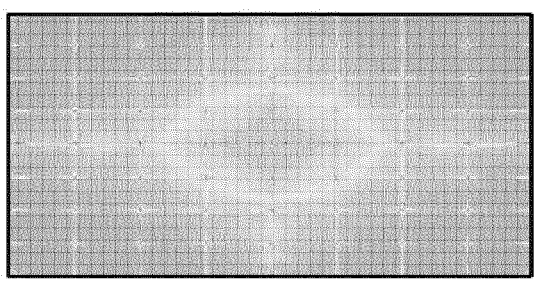
Figure 3J:
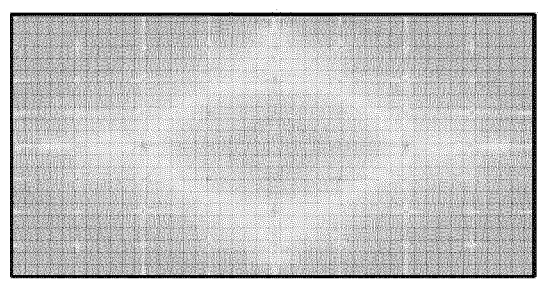
Figure 3K:
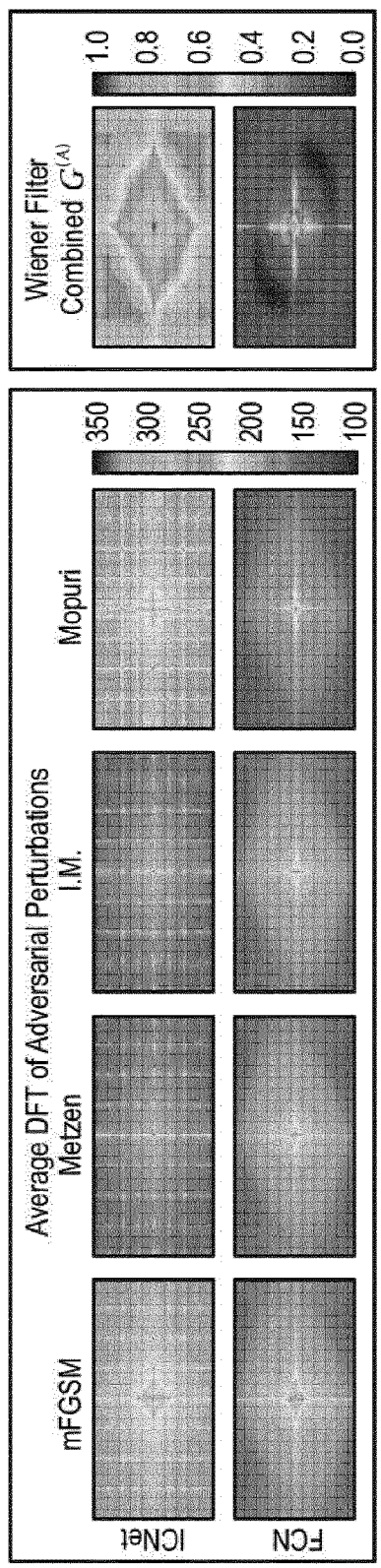
FIG. 3k shows Adversarial Attack average amplitude spectra and Wiener filter visualization according to some aspects of the present disclosure.

FIG. 3c shows a table of a comparison of SSIM and MSE metrics with and without denoising for the ICNet model trained on the Cityscapes dataset. Averaged SSIM and MSE performance was reported over the entire validation set images $DDS^{val}$ with respect to the reference clean images x of (a) the attacked images $x^{adv}$ across all attacks as shown in the table of FIG. 3i with strength $\epsilon = 10$ based on the L . . . norm, (b) the corresponding attacked denoised images x, and (c) the clean filtered images x. In the case of Wiener filtering, the filters are computed over clean and adversarial images with strength $\epsilon = 5$ (unmatched conditions) and $\epsilon = 10$ (matched conditions) spanning the entire training set $DDS^{train}$. An increase in SSIM after denoising, and a corresponding decrease in MSE are desired. The best denoised results are marked in bold, second best underlined, with the Wiener upper limit and single-attack Wiener filters $G^a$, $G^{Metzen\_Ped}$, $G^{mFGSM\_Car}$ being excluded.

FIG. 3d shows a table of a comparison of mIoU (in %) with and without denoising for the ICNet model trained on the Cityscapes dataset. The mIoU are reported with respect to the reference clean images x of (a) the attacked images $x^{adv}$, (b) the attacked denoised images x, and (c) the clean filtered images x over the entire validation set $DCS^{val}$ with adversarial examples ($\epsilon = 10$ based on $\epsilon = 5$ L (unmatched, norm). In the case of Wiener filtering, the filters are computed over clean and adversarial images with strength E=5 (unmatched conditions) and $\epsilon = 10$ (matched conditions) spanning the entire training set $D^{train}_{DS}$ Best results are shown in bold, second best underlined with the Wiener upper limit being excluded.

FIG. 3e shows Comparison of mIoU (in %) with and without denoising for the FCN model trained on the Cityscapes dataset. We report the mIoU w.r.t. the reference clean images x of (a) the attacked images $x^{adv}$, (b) the attacked denoised images x̂, and (c) the clean filtered images x over the entire validation set $DCS^{val}$ with adversarial examples ($\epsilon = 10$ for mFGSM and Mopuri; and $\epsilon = 40$ for Iterative Mirror and Metzen attacks, both based on $L_\infty$ norm). In the case of Wiener filtering, the filters are computed over clean and adversarial images with strength $\epsilon = 10, 40$ (matched conditions) spanning the entire training set $DDS^{train}$ Best results are shown in bold, second best underlined with the Wiener upper limit being excluded.

According to Assion et al., an adversarial attack consists of solving a constrained optimization problem with the constraint being the strength of the perturbation itself, usually in the form of an $L_p$ norm, mostly $L_2$ or L. . . . Additionally depending on the attack input, an adversarial perturbation is usually computed in an iterative gradient based manner by repeated forward and backward passes through different layers of a CNN. An attack is said to be successful, if the optimization goal is reached within the permissible adversarial strength budget in a fixed number of iteration steps. These attacks are further classified depending on the optimization goal, adversary's knowledge, etc. For the sake of consistency, the present disclosure follows the attack conventions proposed by Assion et al. Additionally, adversarial attacks from their framework AidKit was incorporated for the scope of this work. Unlike existing well-known frameworks such as Foolbox, Cleverhans etc., which primarily work on the image classification task, AidKit employs attacks on the complex semantic segmentation task. In this work, two targeted attacks are considered, namely momentum FGSM (mFGSM) (Dong et al.: "Boosting Adversarial Attacks With Momentum" (2018) and Metzen LLM (Metzen et al.: "Universal Adversarial Perturbations Against Semantic Image Segmentation" (2017)), one untargeted attack, namely Mopuri (Reddy et al.: "Generalizable Data-free Objective for Crafting Universal Adversarial Perturbations" (2018)), which at the same time is an image-agnostic attack and one confusion based attack, namely iterative mirror (I.M.) (Metzen et al.: "Universal Adversarial Perturbations Against Semantic Image Segmentation" (2017)). The hyperparameters used for all attacks are reported in FIG. 3f. FIG. 3f shows a table of attack parameters used in this work.

Targeted attacks: A targeted adversarial attack aims at fooling a CNN (Convolutional Neural Network), such that for a given class s∈S, the predicted class $s_i^*(x)$ does not match with the ground truth class $s_i(x)$ at each pixel i∈I of the input image x. The two targeted attacks used in this work are elaborated on as follows.

Momentum FGSM: Goodfellow et al. (in "Explaining and Harnessing Adversarial Examples" (2015) originally proposed the fast gradient sign method (FGSM) which was later on extended to iterative FGSM by Kurakin et al. Dong et al. further boosted the iterative FGSM by integrating a momentum term into the iterative process, resulting in a much stronger and stable attack called momentum FGSM (mFGSM). The details of this attack are reported next. Given set of input images X, imperceptibility constant $\epsilon > 0$ and s∈S as the index of the class (target) that the adversary wants to erase (e.g. pedestrian class), the mFGSM attack effectively tries to solve the following optimization problem $$\min_r \sum_{x \in X'} \|y_s(x + r)\|_2 \text{ s.t. } \|r\|_p \leq \epsilon \quad (19)$$

where $y_s = P(s|x)$ represents the output probability scores for target class s, given an input image x and $\|\cdot\|_p$ represents an $L_p$ norm. This optimization problem is solved in an iterative fashion as follows $$x^{adv}_t = x^{adv}_{t-1} + r_t, \; r_t = r_{t-1} - \lambda \text{sign}(g_t) \quad (20)$$

where t∈{1, 2, . . . , T} denotes the iteration step, $\lambda = \epsilon/T$ denotes the step size. Note that sign (·) E $\{\pm 1\}^{H \times W \times C}$. The perturbation $r_t$ is derived from the input gradient $g_t$ at iteration t as $$g_t = (1 + \mu g_{t-1}) \sum_{j=1}^{|X'|} \nabla_x \|y_s(x_j + r_{j-1})\|_2 \quad (21)$$

where μ denotes the momentum constant and X' denotes the set of input images used to compute the attack, often referred to as scope. For individual scope, i.e. an attack computed for each image individually, only individual images are used, i.e. X'=1. The attack is initialized with $g_0 = 0$, $r_0 = 0$, and the output adversarial image is $x^{adv}=x^{adv}{}_T$. In this paper, attacks of individual scope were considered.

Metzen LLM: Metzen et al. showed the existence of targeted, universal adversarial attacks for state-of-the-art semantic segmentation neural networks. To generate these perturbations, Metzen et al. tried to solve $$\min_r \sum_{x \in \mathcal{X}'} J_{CE}(y(x+r), y^{target}(x)) \text{ s.t. } \|r\|_p \leq \epsilon$$

where $J_{CE}$ denotes the cross-entropy classification loss and $y^{target}(x)$ denotes a fake segmentation output which is created beforehand such that pixels of a target class s are replaced by pixels of the nearest neighbor class following the minimum Euclidean distance calculation. This makes the fake segmentation output look more realistic when a target class s is removed. The reader is referred to Metzen et al.: "Universal Adversarial Perturbations Against Semantic Image Segmentation" (2017) for detailed formulations of $y^{target}$. The optimization problem is solved in an iterative manner similar to (20), with the gradient $g_t$ being $$g_t = \lambda \text{sign}(\nabla_{x} J_{CE}(y(x+r), y^{target}(x))) \quad (23)$$

where $r_0=0$ and $x^{adv}=x_T$. Technically, given such an attack formulation, an attacker can simply create any number of fake segmentation masks by manually designing $y^{target}(x)$ beforehand and optimize the attack towards this attack and it would still be successful. It is shown how this could be done in the iterative mirror attack next.

Confusion-based attacks: Although some attackers might target specific classes, adversarial attacks can also be created with an aim of causing confusion in the output. One example of such an attack is presented by Assion et al. in their framework AidKit, namely iterative mirror.

Iterative mirror: Inspired by the Metzen et al. attack, Assion et al. presented an alternative formulation of the target fake segmentation map $y^{target}(x)$ such that the segmentation output looks like a mirror image, hence creating confusion. This is achieved by simply modifying the $y^{target}(x)$ as follows $$y_{h,x}{}^{target}(x) = y(x)_{h, W-w} \quad (24)$$

where h, w denote the pixel indices along height H and width W of an input image x. This trick simply maps the pixels on the right to pixels on the left and vica versa in the output segmentation map. The rest of the optimization method is the same as shown in (22) and (23) which leads to a mirrored segmentation output.

Untargeted attacks: An untargeted attack does not have a specific preference in a particular class of the output, but rather aims at as many misclassifications as possible.

Data-Free Mopuri: Mopuri et al. proposed an universal adversarial attack that is image- and task-agnostic and generalizes across several architectures. The key idea is to optimize the attack such that the computed perturbation maximizes feature map activations $f_\ell(\cdot)$ of a subset of layers $\ell \in \mathcal{L}$, thereby implying a lot of misclassifications. This is achieved by solving the following optimization problem $$\min_r -\log\left(\prod_{\ell \in \mathcal{L}} \|f_\ell(r_0 + r)\|_2\right) \text{ s.t. } \|r\|_p \leq \epsilon \quad (25)$$

where $f_\ell(\cdot)$ denotes the feature map activations of a layer $\ell \in \mathcal{L}$ and $r_0$ is a randomly initialized perturbation at t=0.

The optimization problem is solved in an iterative way, similar to the Momentum FGSM attack, leading to a strong universal attack. Note that the optimization objective does not need any input clean images, hence it is image-agnostic. This attack also does not need to know anything about the output of the neural network, making it also a task-agnostic attack.

Backward Pass Differential Approximation (BPDA): Athalye et al. introduced the backward pass differential approximation (BPDA) algorithm to generate adversarial examples for pre-processing based defenses that are either hard or impossible to differentiate. More specifically, they propose to compute the gradients over the pre-processing function $g(\cdot)$ by estimating it as an identity function, since it can be assumed that $g(x) \sim x$. BPDA was tested with the strongest attack Momentum FGSM on all the defense methods considered in this work. The attack was computed with regards to. the denoised image using an $L_\infty$ norm with $\epsilon = 10$ as its attack parameters. The computed perturbations are thereafter added on the original input image. With this white-box attack setting, final performance of the model with regards to the attacked images are reported for each of the denoising methods.

In the following, some baseline defenses are introduced. For the complex semantic segmentation task, the investigations were limited to adversarial defenses of type input transformation, specifically the ones that do not need additional retraining. This is done to avoid additional computational overhead. Two well-known categories of such defenses, namely image compression and feature squeezing methods, were investigated. Details of both these methods are presented next. All parameters used for the investigated methods are presented in FIG. 3g. FIG. 3g shows the method parameters used for the evaluation.

Image Compression: Image compression is a well-known technique of reducing redundancy in an image in an efficient form. As an adversarial defense, JPEG compression and JPEG 2000 compression are well-known. JPEG compression was first proposed by Dzuigaite et al. (in "A Study of the Effect of JPEG Compression on Adversarial Images" (2016)). JPEG compression is mainly a lossy compression method that first transforms an image into 8×8 blocks and converts them to frequencies using the discrete cosine transform (DCT). Next, in order to reduce redundancy, it suppresses high frequencies using quantization, thereby introducing unwanted blocking artifacts, specifically at high compression rates.

JPEG 2000 compression was proposed by Aydemir et al. (in "The Effects of JPEG and JPEG2000 Compression on Attacks Using Adversarial Examples" (2018)) in order to alleviate the shortcomings of JPEG compression. As JPEG 2000 uses wavelet transforms over DCT, and does not need image transformation into blocks, blocking artifacts are thereby not introduced, even at high compression rates. However, Aydemir et al. concluded that a good quality or lossless compression does not necessarily mean a good defense, as it also tends to unknowingly preserve the adversarial perturbations.

Feature Squeezing: Xu et al. (in "Feature Squeezing: Detecting Adversarial Examples in Deep Neural Networks" (2018)) introduced feature squeezing as a bunch of techniques that aim at reducing the input space features, thereby reducing the available search space for an adversary. Although there are many such methods possible, they explored bit-depth reduction and spatial smoothing techniques. These methods are, however, proposed from an adversarial detector perspective.

Spatial Smoothing (also known as blur) is widely known in image processing to reduce noise. There are mainly two kinds of spatial smoothing methods, namely local smoothing and non-local smoothing. Local smoothing refers to a smoothing algorithm that utilizes neighboring pixels to smooth a target pixel in an image. Different kinds of weighting mechanisms correspond to different kinds of local smoothing methods, e.g. median, mean, Gaussian smoothing etc. Similar to Aydemir et al., the median smoothing method was applied here for comparison.

In contrast, a non-local smoothing algorithm utilizes much larger areas of the image for smoothing instead of just neighboring pixels. For example, non-local means (NL Means) smoothing, first proposed by Buades et al. (in "A Non-Local Algorithm for Image Denoising" (2005), takes a mean of all pixels in an image, weighted by how similar these pixels are to the target pixel.

Bit-Depth Reduction An 8-bit grayscale image corresponds to $2^8=256$ available colors. In contrast, an 8-bit RGB image corresponds to 24 bits per pixel (8 bits per channel), and therefore $2^{24}$ ~16 million colors. While most humans can recognize black and white images just as good as color images, it is often hypothesized that reducing the number of available color bits might not harm the classification performance as such and thereby also reduce the search space for an adversary.

In the following, experimental results are presented. In this section, two kinds of experiments are discussed. First, adversarial examples are evaluated in the frequency domain and the findings and observations are reported. Second, an in-depth evaluation of the Wiener filters as an adversarial defense method is performed and compared to existing defense methods.

As a first experiment, several adversarial images were investigated in the frequency domain and compared to their clean counterparts. For this, clean images from the Cityscapes dataset were used, and their corresponding attacked images computed for the Momentum FGSM attack on the ICNet model using an $L_\infty$ norm with $\in=10$. At first, the amplitude spectrum of a single sample image in FIG. 3a was visualized. From this graph, it was observed that, although the clean and attacked image looked very similar in the image domain, there were noticeable differences in the frequency domain. More specifically, in contrast to clean images, there exist severe grid-shaped artifacts in the frequency domain of attacked images.

Figure 3L:
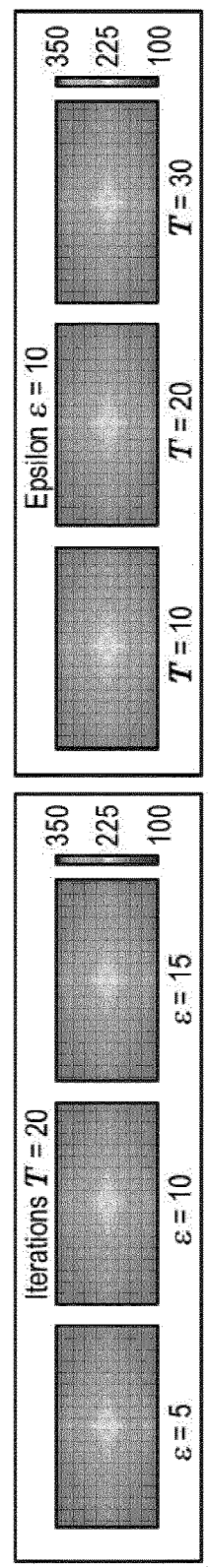
FIG. 3l shows an average DFT of adversarial perturbations varied along attack parameters according to some aspects of the present disclosure.
Figure 3M:
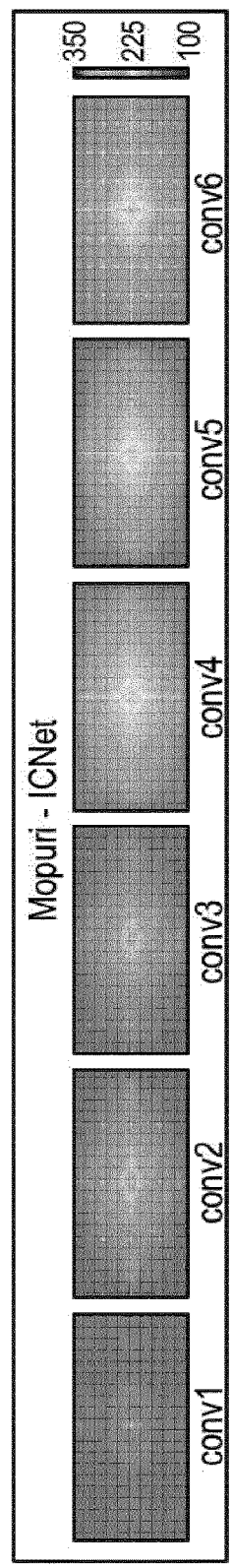
FIG. 3m shows an average DFT of adversarial perturbations for Mopuri attack on ICNet varied along attacked layer according to some aspects of the present disclosure.
Figure 3N:
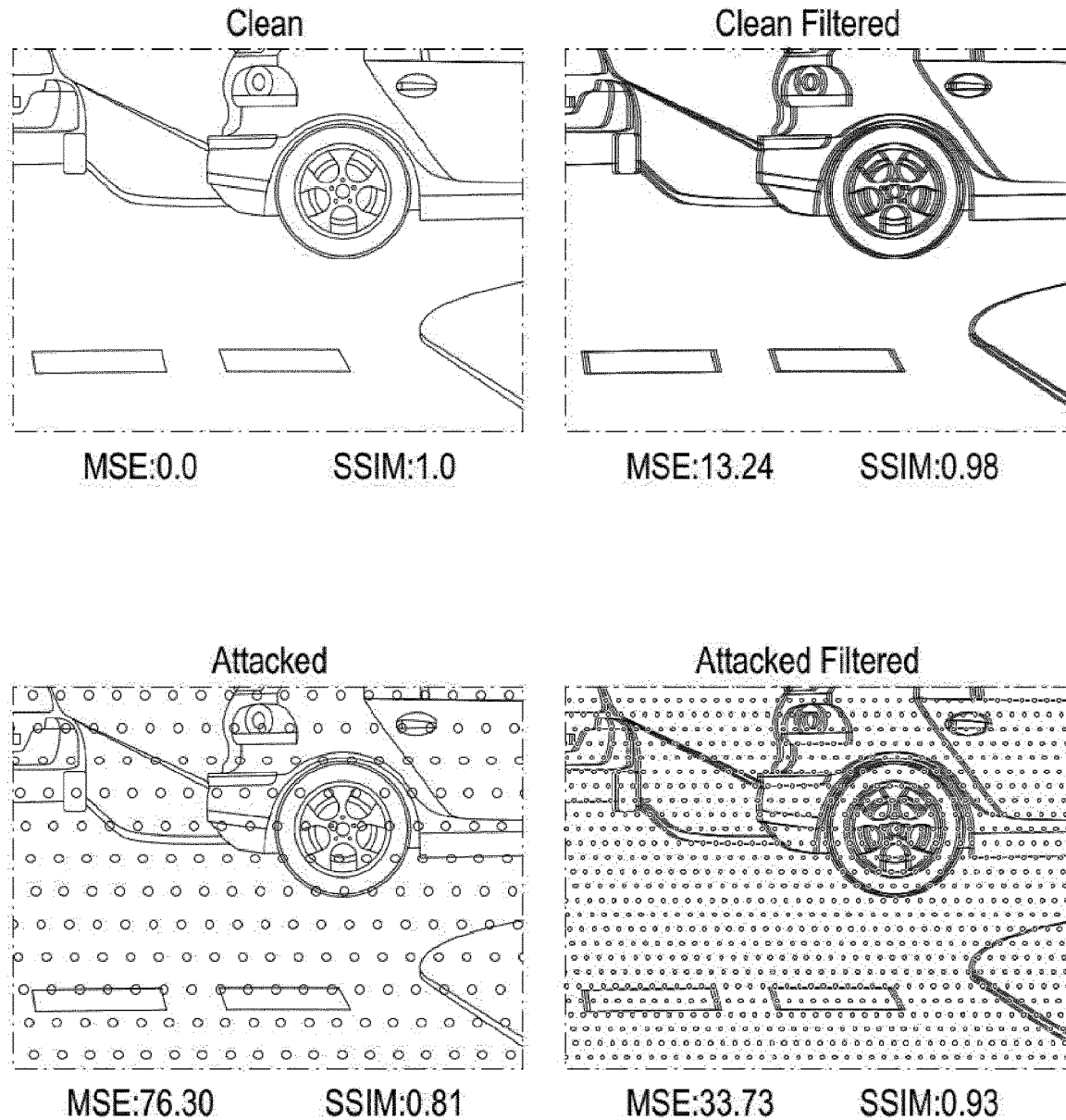
FIG. 3n shows a visualization of Wiener filtering on clean data and perturbed/attacked data according to some aspects of the present disclosure.

Intrigued by this observation, the amplitude spectra of many attacked images (all attacked in the same way) were analyzed, and the average amplitude spectrum was plotted in FIG. 3l. Surprisingly, the grid-shaped patterns were observed consistently in every single attacked image in the exact same manner indicating that these patterns are indeed image-agnostic.

However, since every attacked image so far was computed using the same attack settings, an investigation is performed on whether the artifacts change under different attack settings. The goal may be to identify the source of these artifacts. In order to do this, a series of carefully designed experiments were performed next by varying different attack parameters, one step at a time, and visualize the corresponding averaged amplitude spectra. The results are shown in FIG. 3l.

Effect of attack strength and iterations. For the Momentum FGSM attack, the number of iterations was fixed at T=20 and $\in$[5, 10, 15, 20] was varied. Next, the $\in=10$ was fixed and the number of iterations T $\in$ [10,20,30,50] was varied. Given these settings, average amplitude spectra were computed for 100 randomly chosen images from the Cityscapes validation set. In both these settings, the same grid-shaped pattern was observed, with small variations in the intensities. This indicates that the frequency patterns are also to some extent, attack-configuration independent.

Effect of attack type. Next, different attack types were investigated, i.e. four different attacks as introduced before and visualized averaged amplitude spectra over the entire validation set of 500 images. Note that these attacks have fundamentally different optimization goals (i.e. targeted, untargeted or confusion) and even different optimization techniques. However, even with these fundamental differences in how these attacks are computed, they all lead to the same visible grid-shaped artifacts, in the frequency domain, as seen in FIG. 3l.

Effect of network architecture. It was investigated whether the same grid-shaped artifacts are also observed for a different network architecture. More specifically, the same attacks were implemented for a different model architecture, namely the FCN, trained on the same Cityscapes dataset. From the results shown in FIG. 3a, it was found that the grid-shaped patterns do not exist anymore. However, a different box-shaped artifact is observed which is also seemingly image-type and attack-type independent. From these observations, it was concluded that there exists a strong connection between a network architecture and the nature of adversarial perturbations that can be observed in the frequency domain. To verify this even further, one additional experiment was performed.

Effect of varying layers in Mopuri attack. Although the four adversarial attacks considered have different optimization goals and strategies, they all have one thing in common. They all perform iterative gradient-based optimization which includes multiple forward and backward passes across different layers of the network. While three of the attacks, namely mFGSM, Metzen, and Iterative Mirror need information to be processed through all the layers of the network, the Mopuri attack, however, only needs information to pass through a subset of layers. Thus, the number of layers considered during the attack generation process can be varied and its influence on the grid-shaped artifacts can be studied. More concretely, the layers $\in$ ["conv1", "conv2", "conv3", "conv6"] were varied for the attack on ICNet and its corresponding averaged amplitude spectra were visualized in FIG. 3m. From this plot, clear variations in the grid-shaped patterns can be seen between different layers, thereby proving the hypothesis, that the network architecture has a strong influence on the nature of adversarial perturbations.

During an adversarial attack generation process, an attacker needs access to gradients of an optimization goal with regards to the original input. These gradients are obtained by performing several forward and backward passes through different layers of a network. Traditionally, most CNN architectures have different kinds of layers that either down-sample or up-sample an input signal. Such downsampling and upsampling layers tend to leave unintentional observable artifacts in the frequency domain, which then allows to detect and defend against attacks computed over this target network. Two examples of artifacts based on downsampling and upsampling are given next. Downsampling and aliasing. Incorrect downsampling, i.e., one where the sampling frequency does not satisfy the Nyquist-Shannon sampling criteria, leads to aliasing artifacts which often leave periodic grid points in the frequency domain. A common fix to this problem is to use anti-aliasing filters just before downsampling. Since the ICNet model architecture performs downsampling at multiple scales, without using any anti-aliasing filters, it is hence prone to aliasing artifacts. The effect of aliasing only intensifies as a move is made across the network which is clearly observable from FIG. 3m. Interestingly, the Mopuri attack applied on "conv6" layer leaves patterns that are almost similar to the other attacks, which is primarily because, in this case, each attack uses the same set of layers for computing gradients.

Upsampling and checkerboard patterns. Frank et al. ("Leveraging Frequency Analysis for Deep Fake Image Recognition" (2020), followed by Wang et al. ("CNN-generated images are surprisingly easy to spot . . . for now" (2020) showed that images created by generative adversarial networks (GAN's) also exhibit certain artifacts in the frequency domain, that could be therefore detected to distinguish fake images from real ones. They hypothesize that these artifacts stem from the upsampling operations as during upsampling, we need to fill up empty space, which tends to leave artifacts. Odena et al. also reported similar artifacts called checkerboard artifacts which were linked to deconvolutional operations. The existence of these patterns in adversarial examples has many promising applications such as detection of attacks, defending against attacks, and predicting which model was attacked, etc.

In the following, experiments with defense methods are discussed. Motivated by the findings from the first set of experiments, the benefits of using Wiener filters as a defense for semantic segmentation are investigated.

Effect of denoising on SSIM and MSE. The denoising improvements are investigated using traditional metrics such as SSIM and MSE. FIG. 3h shows SSIM and MSE Results. The method is compared with five other denoising methods and averaged results across six attack types (each computed with an L. norm with $\in=10$) for the entire 500 images of the Cityscapes validation set is shown in FIG. 3c. For the case of Wiener filters, the following four variations are considered:

Image-specific: G (upper limit), computed for each attacked image separately and tested on the same image; Momentum FGSM (Target: Car)

Attack-specific: G (a), computed for an attack type a and tested on the same attack a;

Metzen and mFGSM: G (Metzen_Ped) and G (mFGSM_Car), the same single-attack Wiener filters with the attack type a being Metzen (target: pedestrian) and mFGSM (target: car) respectively, and tested on all six attacks; and Combined: $G^{(A)}$ (14), computed as an average of all single-attack Wiener filters.

In addition, each Wiener filter variation is further tested in matched ($\in=10$) and unmatched ($\in=5$) conditions. From the results shown in FIG. 3c, improvements in both metrics SSIM and MSE are reported using the proposed method.

Essentially, more or less every Wiener filter variation increases the SSIM (on average+4%) and decreases the MSE (on average-19 units) for all attacks. Meanwhile, Wiener filtering barely affects the clean images, as indicated by a consistently high SSIM (on average +0.99) and low MSE (on average 9.24 units) across all filter variations. In contrast, most of the baseline methods (except NL Means) barely improve the SSIM (on average+0.87%), and in fact lead to a higher MSE (on average+4.74 units) after denoising. NL Means, however, improves SSIM by +3% and reduces MSE by −18 units, but is still worse than Wiener filter.

Additionally, it was observed that Wiener filters tend to generalize across unseen attacks indicated by an average+ 3.5% SSIM improvement and an average-17.31 units reduction in MSE for G (Metzen_Ped) and G (mFGSM_Car) combined. They also seem to generalize across mismatch since for all mismatched cases, the corresponding SSIM increases and the MSE decreases. From the earlier Fourier-domain analysis, it was shown that frequency patterns of adversarial perturbations tend to remain similar across different attack types and also different attack settings (specifically). Hence, a corresponding increase in SSIM and a decrease in MSE in these settings can be considered expected and in line with the present observations.

Effect of denoising on mIoU (Lx norm). The improvement in mean Intersection over Union (mIoU) was investigated with all the methods on two models, namely ICNet and FCN. The average results over all attacks for both models are shown in FIG. 3i. FIG. 3i show mIoU Results. For both models, attacks are computed based on L. norm with attack strength as shown in FIG. 3c. From the results, it was observed that the improvements in mIoU follow a similar trend to those observed in the SSIM and MSE evaluation. More or less every variation of the Wiener filter outperforms every other baseline method except NL Means. Concretely, a 5% absolute improvement in mIoU (on attacked images) was observed when averaged across all variations of Wiener filters. At the same time, the performance on clean images remains largely unaffected with only a 0.5% absolute decrease in mIoU.

In comparison, NL means also performs surprisingly well, with a 5.8% absolute increase in mIoU on attacked image, although at a cost of 1.75% absolute decrease on clean images. Unexpectedly, the other baseline methods, namely JPEG compression, JPEG2000 compression, median blurring and bit-depth reduction, even under their best parameter settings, result in only marginal improvements (average 0.37%) on attacked images. These results are in contradiction to existing defense work on relatively easier tasks such as image classification, and hence highlight the importance of evaluating defense methods on real-world complex tasks (e.g. semantic segmentation) and on large-resolution data sets (e.g. Cityscapes).

Since it can be argued that a 5.64% or 5.8% absolute improvement with $G^{(A)}$ and NL Means, respectively, is probably still inadequate, we further evaluate multiple combinations of these defense methods to further boost the state-of-the-art. Our results conclude that most variations of Wiener filter when combined with NL means, perform best overall. Particularly, combined Wiener filter $G^{(A)}$ paired with NL Means achieves an impressive+10.95% absolute improvement in mIoU under matched settings, and +8.97% absolute improvement under unmatched setting at a cost of −2.07% and −1.78% on clean images, respectively.

Generalization across $L_p$ norms. In addition to $L_\infty$ norm, the he benefits of each denoising method under an attack were investigated based on the $L_2$ norm. For this, the ICNet model was considered, and adversarial images for the Momentum FGSM were generated ($\in=5000$) targeted on Car class. Interestingly, for this case, the Wiener filters computed already for the L., norm using $\in=10$ were used instead to check the generalization across different norms. The results are shown in FIG. 3i. From this, it was observed that median blurring performed really well with a 4.48% absolute improvement on attacked images. In comparison, NL means came second at 2.46%. In comparison, the Wiener filter based on an $L_\infty$ norm improved the mIoU by 2.3%. While, this might be a small change, the fact that it works at all is indeed surprising. The best defense (Wiener filter+ NLM) still performs the best here reaching a 5.47% improvement in mIoU, even though it can be considered an unmatched case. These results only indicate the potential of Wiener filtering as a denoising method, since the adversarial frequencies it targets tend to remain consistently similar even under various attack settings.

Generalization across white-box attacks (BPDA). Lastly, the performance of the model was investigated in a white-box setting considering the BPDA attack algorithm with the Momentum FGSM attack as described above. The mFGSM attack was computed using the Loo norm with $\in=10$ with each denoising method included separately. The attack parameters were kept fixed for each model type (i.e. with each denoising method used as an input pre-processing step) and its performance at the end of the attack on the attacked images was evaluated. The results are shown in FIG. 3$i$. The results show that Wiener filtering and NL Means, both are relatively strong defenses with 23% mIoU at the end of the attack. However, as expected, when both WF and NL Means are combined, the improvement is significantly higher at 34.01% mIoU. All other baseline methods perform much worse at around 15% mIoU on attacked images.

FIG. 3$j$ show average amplitude spectra for different attacks. The average amplitude spectrum of various adversarial perturbations computed on the ICNet model trained on Cityscapes, i.e., $E(|\mathcal{F}(x^{adv}-x)|)$ with x, $x^{adv} \in x^{val}$ is visualized. It can be observed that for the underlying model similar grid patterns arise in different images on different attack types.

FIG. 3$k$ shows Adversarial Attack average amplitude spectra and Wiener filter visualization. FIG. 3$l$ shows an average DFT of adversarial perturbations varied along attack parameters: attack strength, and total number of iterations T. FIG. 3$m$ shows an average DFT of adversarial perturbations for Mopuri attack on ICNet varied along attacked layer.

FIG. 3$n$ shows a visualization of Wiener filtering on clean data and perturbed/attacked data. An example image $x \in X^{val}$ is cropped and visualized to demonstrate the effect of denoising using a Wiener filter G as shown in (8) for the Mopuri attack with $\in=10$. Additionally, the MSE and the SSIM is reported with respect to the unfiltered clean data. It can be seen that Wiener filtering on clean data leads to an increase of MSE, but still keeps the SSIM at a reasonably high value. On the other hand, when being applied to perturbed/attacked data, the Wiener filtering successfully decreases the MSE, while at the same time it substantially increases the SSIM.

In the present disclosure, a frequency-domain analysis of adversarial images was performed across four attack types for the semantic segmentation task and several new observations were reported. First, it was observed that in the frequency domain, attacked images tend to have distinct frequency patterns from their clean counterparts, and these patterns remain largely image- and attack-type independent. Further investigations reveal that there exist strong connections between the network architecture and the nature of adversarial perturbations. More specifically, it was concluded that during the optimization process of an attack, as a perturbation is fed through different sub-sampling and upsampling layers of a network, they tend to leave observable patterns/artifacts in the frequency domain. An adversarial defense method was proposed that suppresses adversarial frequencies based on the well-known Wiener filters. These Wiener filters capture frequency patterns typically representative of adversarial perturbations and suppress them in the frequency domain. Using the proposed method, five state-of-the-art methods were surpassed by a large margin.

As already mentioned, in embodiments the respective methods may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F) PLAs) or (field) programmable gate arrays ((F) PGAs), programmed to perform said steps of the above-described methods.

The description and drawings merely illustrate various aspects of the present disclosure. It will thus be appreciated that those skilled in the art will be able to devise various arrangements that, although not explicitly described or shown herein, embody the principles of the present disclosure and are included within its scope. Furthermore, all examples recited herein are principally intended expressly to be only for pedagogical purposes to aid the reader in understanding the principles of the present disclosure and the configurations contributed by the inventor(s) to furthering the art, and are to be construed as being without limitation to such specifically recited examples and conditions. Moreover, all statements herein reciting principles, aspects, and embodiments of the present disclosure, as well as specific examples thereof, are intended to encompass equivalents thereof. The present disclosure is defined by the claims.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the present disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

LIST OF REFERENCE SIGNS

10 System for processing image data
12 Interface
14 One or more processing devices
16 One or more storage devices
20 System for generating a filter
22 Interface
24 One or more processing devices
26 One or more storage devices
100 Vehicle
105 Camera
110 Obtaining image data
115 Transforming the image data into the frequency domain
120 Applying a filter on the image data to generate filtered image data
125 Transforming the filtered image data into the spatial domain
130 Processing the filtered image data
140 Detecting a presence of adversarial perturbations
210 Obtaining sets of images
220 Transforming the sets of images into the frequency domain
230 Determining a difference
240 Generating a filter

The invention claimed is:

1. A method for processing image data, comprising:
obtaining image data from a camera sensor of a vehicle;
transforming the image data into a frequency domain;
applying a filter to the transformed image data in the frequency domain to generate filtered image data, the filter comprising a Wiener filter configured to suppress adversarial perturbations within the image data occurring according to one or more regular patterns in the frequency domain to improve robustness of a machine-learning model against adversarial perturbations;
transforming the filtered image data into the spatial domain; and
processing the transformed filtered image data using a machine-learning model to perform object detection or image segmentation for a driving assistance feature of the vehicle, wherein the filtered image data is input to the machine-learning model after the filtered image data is transformed into the spatial domain.

2. The method according to claim 1, wherein applying the filter comprises multiplying the filter with the image data in the frequency domain, and suppressing a subset of frequencies that are indicative of adversarial perturbations.

3. The method according to claim 2, wherein the subset of frequencies that are indicative of adversarial perturbations, and suppressed by the filter, occur according to one or more regular patterns in the frequency domain.

4. The method according to claim 1, wherein the filter is based on a plurality of types of adversarial perturbations.

5. The method according to claim 1, further comprising triggering an alert in the vehicle's autonomous or semi-autonomous driving assistance system in response to a detected presence of adversarial perturbations to improve vehicle safety.

6. The method according to claim 1, further comprising detecting a presence of adversarial perturbations based on a comparison between the image data and the filtered image data.

7. The method according to claim 1, wherein the machine-learning model comprises a deep neural network.

8. A system for processing image data, comprising:
an interface for obtaining image data from a camera sensor of a vehicle;
a memory, operatively coupled to the interface; and
a processing apparatus, operatively coupled to the memory, wherein the processing apparatus is configured to
transform the image data into a frequency domain;
apply a filter to the transformed image data in the frequency domain to generate filtered image data, the filter comprising a Wiener filter configured to suppress adversarial perturbations within the image data; transform the filtered image data into the spatial domain; and process the transformed filtered image data using a machine-learning model, wherein the filtered image data is input to the machine-learning model after the filter image data is transformed into the spatial domain.

9. The system according to claim 8, wherein the processing apparatus is configured to apply the filter by multiplying the filter with the image data in the frequency domain, and suppressing a subset of frequencies that are indicative of adversarial perturbations.

10. The system according to claim 9, wherein the subset of frequencies that are indicative of adversarial perturbations, and suppressed by the filter, occur according to one or more regular patterns in the frequency domain.

11. The system according to claim 8, wherein the filter is based on a plurality of types of adversarial perturbations.

12. The system according to claim 8, further comprising triggering an alert in the vehicle's autonomous or semi-autonomous driving assistance system in response to a detected presence of adversarial perturbations to improve vehicle safety.

13. The system according to claim 8, wherein the processing apparatus is configured to detect a presence of adversarial perturbations based on a comparison between the image data and the filtered image data.

14. The system according to claim 8, wherein the machine-learning model comprises a deep neural network.

15. A non-transitory computer-readable medium storing instructions that, when executed by one or more processors of a vehicle system, cause the one or more processors to:
obtain image data from a camera sensor of the vehicle;
transform the image data into a frequency domain;
apply a filter to the transformed image data in the frequency domain to generate filtered image data, the filter comprising a Wiener filter configured to suppress adversarial perturbations within the image data occurring according to one or more regular patterns in the frequency domain to improve robustness of a machine-learning model against adversarial perturbations;
transform the filtered image data into the spatial domain; and
process the transformed filtered image data using the machine-learning model to perform object detection or image segmentation for a driving-assistance feature of the vehicle,
wherein the filtered image data is input to the machine-learning model after the filtered image data is transformed into the spatial domain.

16. The computer-readable medium according to claim 15, wherein the instructions further cause the one or more processors to select, from a plurality of predefined parameter sets, a parameter set for the Wiener filter based on at least one of a vehicle speed, ambient illumination, or sensor-noise level.

17. The computer-readable medium according to claim 16, wherein the instructions further cause the one or more processors to monitor a confidence level of an output of the machine-learning model and to select a different parameter set for the Wiener filter in response to the confidence level falling below a threshold.

18. The computer-readable medium according to claim 15, wherein applying the filter comprises weighting suppression of frequencies associated with the adversarial perturbations according to respective amplitudes of the frequencies in the transformed image data.

19. The computer-readable medium according to claim 15, wherein the image data comprises at least one of camera, radar, or lidar sensor data of the vehicle, and the filter is applied to the sensor data transformed into a frequency domain corresponding to the respective sensor type.

20. The computer-readable medium according to claim 15, wherein the instructions further cause the one or more processors to trigger a diagnostic alert in the vehicle's driving-assistance controller when a difference between the image data and the filtered image data exceeds a threshold.

* * * * *